United States Patent [19]

Scarr et al.

[11] Patent Number: 5,659,547
[45] Date of Patent: Aug. 19, 1997

[54] SCRIPT-BASED SYSTEM FOR TESTING A MULTI-USER COMPUTER SYSTEM

[75] Inventors: James L. Scarr, Akron; Katherine Karolick, Brecksville; Nacine M. Reid, Parma Hights, all of Ohio; Armin Pressler, Indianapolis, Ind.; Sandy J. Bartkus, Midland, Mich.

[73] Assignee: The Dow Chemical Company, Midland, Mich.

[21] Appl. No.: 385,369

[22] Filed: Feb. 7, 1995

Related U.S. Application Data

[63] Continuation of Ser. No. 936,395, Aug. 31, 1992, abandoned.
[51] Int. Cl.[6] .................................................... G06F 13/00
[52] U.S. Cl. .............................. 395/182.02; 395/200.54; 395/182.18
[58] Field of Search .............................. 371/18; 395/200, 395/325

[56] References Cited

U.S. PATENT DOCUMENTS

| | | | |
|---|---|---|---|
| 5,287,456 | 2/1994 | Rhodes et al. | 395/200 |
| 5,293,488 | 3/1994 | Riley et al. | 395/200 |
| 5,313,632 | 5/1994 | Sekizawa et al. | 395/200 |

OTHER PUBLICATIONS

Hewlett–Packard Journal, vol. 37, No. 3, Mar. 1986, Amstelveen, NL pp. 24–28, C.D. Fuget et al. "Tools for Automating Software Test Package Execution".

AT&T Technical Journal, vol. 69, No. 2, Mar. 1990, New York US pp. 65–75 XP137588, K.C. Archie et al. "Environments for Testing Software Systems".

Office Automation, Concepts and Tools, 1985, Springer–Verlag, Berlin, DE pp. 113–133, J. Hogg "Intelligent Message Systems".

*Primary Examiner*—Vincent P. Canney
*Attorney, Agent, or Firm*—Sterne, Kessler, Goldstein and Fox

[57] ABSTRACT

A testing system and method for defining testing scenarios for a multi-user computer system having a plurality of workstations, and for driving and tracking the execution of the testing scenarios in a predefined order at the workstations is disclosed. The system and method revolve around the concept of a "script". Each script or script set is intended to reflect one business scenario. Each script contains instructions, data, and routing information used to execute the testing scenario on the workstations of the multi-user computer system. The testing system includes a maintenance and creation means for creating and modifying scripts; a tracking administration means for grouping selected scripts to form the test, for initiating a test run, for monitoring routing of the scripts from workstation to workstation, for selectively controlling routing of the scripts from workstation to workstation in an error situation, and for automatically generating statistical reports detailing the performance of the test; and a tracking means for routing the selected scripts to selected workstations according to the routing information.

22 Claims, 16 Drawing Sheets

SCRIPT-BASED SYSTEM FOR TESTING A MULTI-USER COMPUTER SYSTEM

This application is a continuation of application Ser. No. 07/936,395, filed Aug. 31, 1992, now abandoned.

BACKGROUND OF THE INVENTION

1. Field of the invention

This invention relates generally to the testing of a multi-user computer system. More specifically, the invention is concerned with a system and method for defining one or more testing scenarios and for driving and tracking the execution of the testing scenarios.

2. Related Art

Multi-user computer systems are used throughout the business and scientific communities to perform a myriad of functions. For example, in the business community, computer systems are used to perform manufacturing automation, inventory management, order processing and tracking, financial accounting, records management, word processing, etcetera. These functions may be performed company wide on a single networked computer system which includes many workstations. The size and complexity of such a networked computer system may range from a global structure which includes workstations situated at remote sites around the world to a local network which includes several workstations located at a single corporate site.

An example of one such computer system is SAP (System, Applications and Products in Data Processing). SAP is a business software package consisting of an R/2 Basis System and one or more specialized applications modules (e.g., financial accounting, order entry, etc.). The R/2 Basis System is a platform on which the various applications modules run. The SAP system is available from SAP GmBh, Max Planck Strasse 8, D-6909 Walldoff, Germany.

The SAP system operates in conjunction with a multi-user computer system. The term "multi-user" is used herein to mean a computer system which can simultaneously be used by a plurality of users. A "physical workstation" is a "dummy" terminal, a personal computer or any other I/O (input/output) device which allows a user to communicate with the computer system. A "physical workstation" is also referred to as a "terminal". As used herein, the term "logical workstation", or simply, "workstation" shall mean a functional location which includes one or more physical workstations or terminals. For example, an accounting department which includes five terminals may be considered a single logical workstation. A logical workstation may also be termed a "test station". The workstations are linked to a central computer (a multi-user computer) containing the SAP system.

In a global business arrangement, for example, a multi-user computer system may be used to receive a product order at a workstation in Paris. The order may result in a request for shipment appearing on a workstation in a manufacturing plant in Chicago where the product would be produced and shipped. Billing (accounts receivable) processing may occur in London on another workstation, while company wide financial analysis could take place in New York on yet another workstation. Each of these business functions would be carried out using various modules running within the SAP System.

Because businesses rely extensively on computer systems, such as SAP, it is crucial that the integrity and reliability of these systems be thoroughly tested prior to total commercial reliance being placed thereon. Testing of these complex multi-user systems, however, is arduous and complicated due to their immense size, complexity, and distributed nature. For example, if it is desired to test the functionality of the order entry portion of the SAP system, then it is preferred to recruit the assistance of a user of that portion of SAP. Similarly, if it is desired to test the functionality of the cost accounting portion of the SAP system, then it is preferred to recruit the assistance of a user of that portion of SAP. However, the person desiring to perform the test may be located in the United States while the order entry user is located at a plant in Europe and the accounting user is located at a plant in Canada. This makes the communications and coordination between these persons difficult during testing.

This problem is exacerbated by the fact that the multi-user computer systems require frequent modification/revision to meet the changing needs of a business. For example, SAP provides several means (tools and features) for customizing the system and for designing customer specific application software and subsystems. These include:

ABAP/4 or Advanced Business Application Programming (SAP's fourth generation programming language used to create transaction programs, utility programs, database queries, etc.);

Screen Painter (used to design the online screen layout);

Dynpro or Dynamic Program (the online screen and the processing unique thereto);

Data Dictionary (a central repository for data definitions and meta-data, also used to define fields within a Dynpro);

Database (holds master file data and transaction data); and

Table (within SAP, tables are used for process control, system and screen modification, logic checks and validation of data entries, among other things, the benefits of Table include the ability to customize SAP without the need to programmatically change the system, tables are often created in conjunction with customer created applications).

Whenever the multi-user computer system is modified, testing is required. As discussed above, however, testing such a large system is arduous.

SUMMARY OF THE INVENTION

The present invention is a computer-based testing system for defining and managing a test for a multi-user computer system. The multi-user computer system includes a central computer, workstations which are coupled to the central computer, and an application (e.g., SAP) running on the computer system. A test is made up of a selected group of scripts. Each script contains instructions, data and routing information.

The instructions contained within a script provide step by step directions for an operator at a workstation to conduct a portion of a test (execution of a test usually involves many "test runs". Each script also contains any data that the operator will require to carry out the instructions. The routing information contained within each script indicates to which workstations the script should be routed and the order in which the routing should occur.

The present invention includes a maintenance and creation means (script maintenance and creation sub-system) for creating and modifying scripts. A script administration means (script administration sub-system) provides a means for copying and deleting groups of scripts, limiting access to scripts and updating groups of scripts. A tracking means (script tracking sub-system) routes the scripts in a test to the appropriate workstations, as set forth in the routing information for each script, during a test run. A tracking administration means (tracking administration sub-system) provides a means for selectively grouping selected scripts to form a test, initiating a test run, monitoring the transfer of the scripts from workstation to workstation during a test run, and automatically documenting the test results. In addition, the tracking administration means can control transfer of the scripts during an error situation.

The system and method of the present invention operates in the following manner. A test administrator utilizes the tracking administration sub-system to select a group of scripts which in combination will create a test to verify an aspect or function of the multi-user computer system. The scripts would have been previously created through the use of the script maintenance and creation sub-system. In addition, each selected script must have been previously given an "activated" status through use of the script administration sub-system. Each script provides a user of a selected workstation with step by step instructions and any data needed to perform a portion of the test.

The test administrator initiates the test run. The script tracking sub-system routes each script to the appropriate workstation for execution. A user at each workstation executes a portion of the test in accordance with the instructions contained in the script which is routed to the user's workstation. After the user has completed execution of the script, the script is transferred to the next workstation as indicated in the scripts routing information.

BRIEF DESCRIPTION OF THE DRAWINGS

The foregoing and other objects, features and advantages should become apparent from the following detailed description when taken in conjunction with the accompanying drawings, in which.

DETAILED DESCRIPTION

Figure 1:
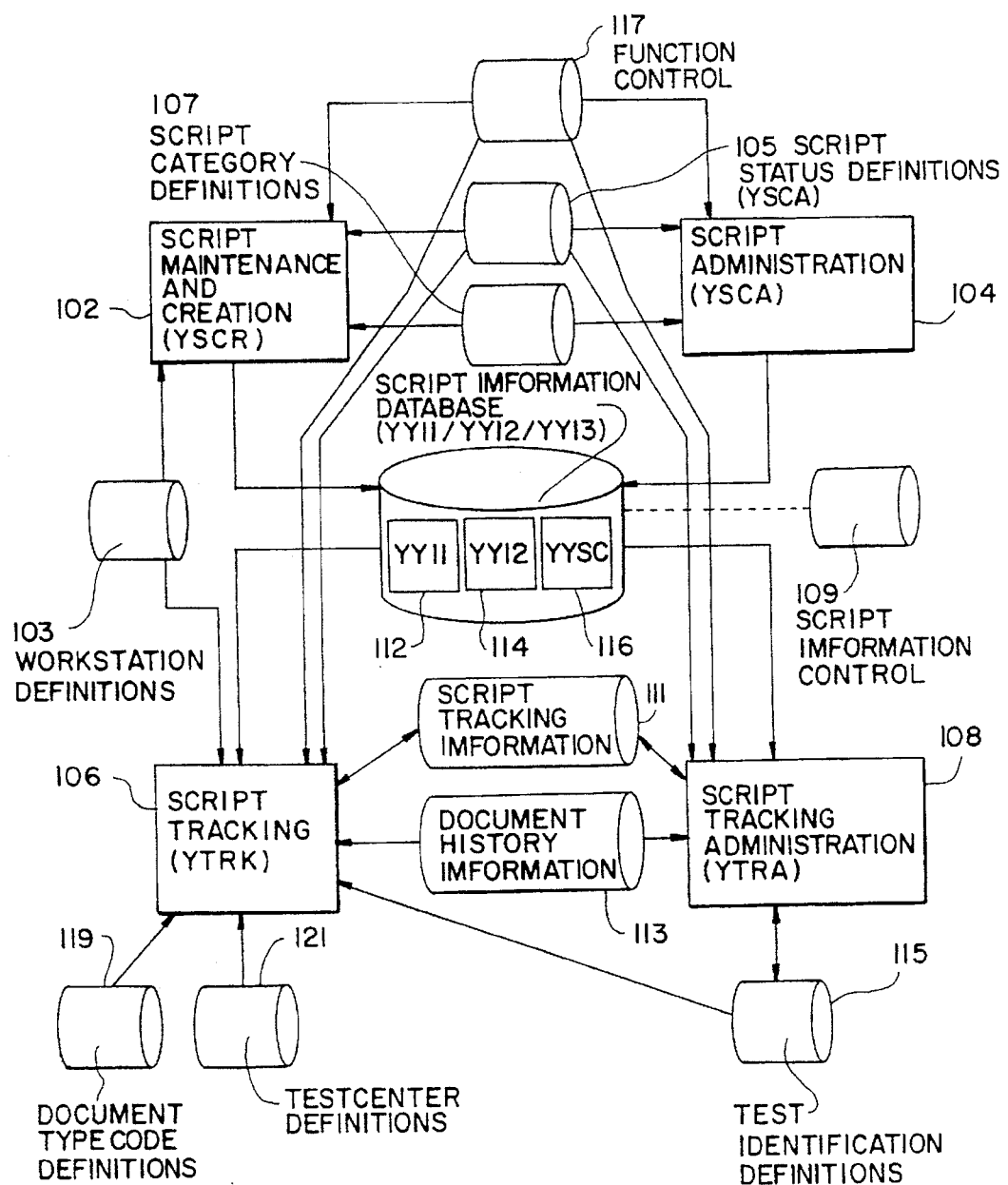
FIG. 1 is a high level overview of the component parts of a preferred embodiment of the present invention.

I. OVERVIEW
  a. Introduction
  b. Format of a Script
  c. The Data Bases and Tables
    1. Script Header File 112
    2. Script Section File 114
    3. Script Procedures File 116
    4. Script Information Control Table 109
    5. Script Tracking Information Table 111
    6. Script Document History Table 113
    7. Workstation Definitions Table 103
    8. Script and Test Status Definitions Table 105
    9. Script Test Identifications Table 115
    10. Script Document History Information Table 119
    11. Test Center Definitions Table 121
    12. Script Category Codes Table 107
    13. Function Control Table 117
II. SCRIPT MAINTENANCE AND CREATION SUB-SYSTEM (YSCR)
  a. Purpose
  b. Sub-system Functions
    1. Basic Sections 408
    2. Order Life Cycle ("OLC") Sections 410
    3. Plant Information Management ("PIM") Sections 412
    4. Financial Accounting System ("FAS") Sections 414
    5. Utilities 406
  c. Script Database Access/Update
III. SCRIPT ADMINISTRATION SUB-SYSTEM (YSCA)
  a. Purpose
  b. Sub-system Functions
    1. Overview
    2. Status, Blocking and Categories
    3. Mass Update Functions
    4. Reports
IV. SCRIPT TRACKING ADMINISTRATION SUB-SYSTEM (YTRA)
  a. Purpose
  b. Sub-system Functions
  c. Operation
V. SCRIPT TRACKING SUB-SYSTEM (YTRK)
  a. Purpose
  b. Sub-system Functions
  c. Method of Script Tracking
VI. CONCLUSION
I. OVERVIEW a. Introduction

In general the present invention includes a system and method for defining fact-based testing scenarios for testing a multi-user computer system and for driving and tracking the execution of the testing scenarios in a predefined order. In a preferred embodiment of the present invention, the testing scenarios are intended to test and verify modifications and customized applications in the SAP system described above. The invention revolves around the concept of a "script". Several related or dependent scripts make up a "script set". Each script or script set is intended to reflect one testing scenario.

Because the SAP system is a business oriented system, in the preferred embodiment of the invention, the fact-based testing scenarios are referred to as "business scenarios" for ease of reference and a script is defined as a document containing instructional information and necessary data that when executed (through user interaction with the SAP system via a workstation), simulates a business scenario. The system of the present invention does not directly perform the "test". Instead, the script provides different users of a multi-user computer system with instructions, testing data and expected results which permit the users to interact with the system being tested and thereby act out the business scenario. In the preferred embodiment, the objective is to test the functionality of a portion of the SAP system.

The script data is logically organized into sections that relate to workstations in the SAP system being tested. Each workstation in the Script Information System (SIS) corresponds to an actual business function. As defined above, a "workstation" (e.g., an accounting department) may include any number of physical workstations (i.e., terminals). During the execution of a business scenario (e.g., a script), a user at each logical workstation executes the section of a script pertaining to that workstation. The execution of a section of a script involves following the instructions contained in that section of the script. For example, one section of a script might instruct a Customer Service Representative ("CSR") to enter an order into the SAP system at the customer service workstation. The script would also provide the CSR with all the necessary order information (data). Another section of the same script might instruct a Shipping Coordinator ("SC") at a shipping workstation to arrange for the transportation of the materials needed to fill that order. Again, the script would provide the SC with any data that might be required.

The workstations are defined to the script in a section of the script called "routing". The routing section tells the system the sequence of workstations which the script will follow. The system then monitors the progress of the script along the routing path. A test is made up of one or more scripts or script sets.

For execution of a test, a tester (i.e., a user) is assigned to each workstation based on his or her area of expertise (e.g., order entry, cost accounting, etc.). Each tester processes his portion of the script. The script is then passed on to the next workstation defined in the routing section of the script. When a script has been executed at all workstations listed in its routing section, it has completed a "run". A test is considered complete when a run of the scripts assigned to the test produces no major errors and meets the predetermined expected results. Many test runs may occur during a test, before it is considered complete.

During the script execution an error may be detected. At that time the tester for the workstation at which the error is detected informs the system that an error is present and, if warranted, the script is halted until the error is resolved. After the error has been resolved, either by system changes or script changes, the script is re-entered into the test system according to the routing information. This is known as an iteration or script cycle. It may take several iterations to complete processing of a script within a run.

A preferred embodiment of the present invention works in conjunction with an SIR (System Incident Report) system. The SIR System is a problem management system built within SAP technology. The SIR System is a means for documenting and communicating problems and modification within the SAP System. An SIR, which is created using the SIR System, contains the information needed for problem and/or modification evaluation, prioritization and resolution. The SIR System's functions include recording, tracking and aiding in the management of problems and modifications through various reporting capabilities. In a preferred embodiments of the present invention, when an error is detected during the execution of a script, the SIR system is utilized to record information pertaining to the error.

The testing procedure involves the assembly of a tester from each logical workstation (e.g., Order Entry, Order Management, Plant Information Management, Order Completion and Accounting) and often from different countries into a single location which has been set up with a plurality of workstations to simulate a global distributed computer system. Each tester runs a specific part of a script routed to his workstation, records the results, and passes the script along to the next workstation (as defined by the routing section) until the script is completed. If an error occurs, the script may be placed on hold until the problem is resolved.

Originally, a script was created and maintained as a paper document (similar to an actor's script. The scripts were manually maintained, organized and stored in boxes. The testing process required that each script be manually passed by the testers from one workstation to the next. This required that all testers be located at a single location (preferably in the same room).

Gathering all testers to a single location and manually passing scripts between workstations tended to be a tedious, time consuming, and expensive undertaking.

The Script Information System of the invention was developed to facilitate a more effective and efficient method of creating, maintaining, and executing the scripts. The system eliminates the requirement that the testing process be executed in a single geographical area and in turn promotes the philosophy of remote testing. The Script Information System comprises four components: Script Maintenance and Creation (YSCR) 102, Script Administration (YSCA) 104, Script Tracking (YTRK) 106, and Script Tracking Administration (YTRA) 108, shown in FIG. 1.

In the preferred embodiment of the present invention, SIS is designed, developed, and executed within the SAP environment utilizing the ABAP/4 language. All four components are integrated and utilize script information that is storm on three SAP databases. There are also SAP tables which support all of the activities of the SIS sub-systems or components. The purpose and structure of the data bases and tables are detailed in later sections.

In a preferred embodiment of the present invention, the Scripts Information System runs on the same multi-user computer system that is being tested. However, the Scripts Information System may also be implemented on a separate computer system. In that case, the separate computer system would have a terminal co-located with each workstation to be tested to provide each tester with access to the Scripts Information System.

The SIR System described above may be utilized in conjunction with the present invention for the generation, tracking and resolution of errors, both in the application program being tested and in the scripts themselves. Preferably such a system would interface directly with the system of the invention. A tester would then be able to record problems encountered during a test without leaving SIS. The record of the problem is referred to as an SIR (System Incident Report).

Human interaction with, and control of, the script system sub-systems (YSCR, YSCA, YTRK, and YTRA) is primarily accomplished through a menu driven interface at a terminal. Within the menus the user interacts and controls the system by the use of either function keys (PFkeys) or the entry of a function code from each screen in the system. The function code is a two character field that is used to key a table to control SIS processing. Function codes are defined in a function control table 117.

The Script Maintenance and Creation Sub-system ("YSCR") is used to create and maintain all scripts. This sub-system enables the user to enter all relevant script information, including workstation routing information, script narrative, a recap of the script, tester instructions, and all data required for testing. In addition to the entry of information, this sub-system provides the next available script number and also offers reporting and copy/delete features.

The Script Administration Sub-system ("YSCA") is used to maintain a large database of scripts. This sub-system enables a Script Administrator (a person responsible for managing SIS) to edit, copy or delete groups of scripts according to a selection criteria (e.g., status, blocking indicator, categories and the like). An informational recap of the selected scripts is provided to aid in the script identification. Thus, the Script Administrator is able to perform mass copy and delete functions; and mass updates of status, blocking indicators and categories. In addition, YSCA allows the Script Administrator to generate script, recap and category reports.

The Script Tracking sub-system ("YTRK") facilitates remote testing. YTRK is arranged around the functionality of "checking-out" and "checking-in" scripts. This procedure is similar to the way books are checked-out (borrowed) and checked-in (returned) from a library. A script is checked-out for use by a workstation and then checked back in to indicate completion of use of the script by the workstation tester. The system then forwards the script to the next workstation. The system also assigns tracking status codes to the individual scripts to aid the testers in script processing.

The Script Tracking Administration sub-system ("YTRA") of this system was designed to perform four functions: Test Creation, Test Management, Test Progress Reporting, and Test Archival. All areas focus on the control of testing. Each of these functions is discussed below.

The Test Administrator is the person responsible for managing a test. It is therefore his responsibility to setup the test and define it to the system. The Test Administrator defines the test name and identifies all the scripts which are to be processed through sub-system YTRA. This is test creation.

The Test Administrator can also define a priority for a script. The priority of a script is displayed at the terminal to aid the tester in selecting which script to process.

Management of the test process Crest Management) is the foremost function of YTRA. This function includes monitoring and controlling workflow. Monitoring includes identifying bottlenecks and problem workstations so that relief can be administered to expedite testing.

Controlling workflow involves keeping scripts flowing through to the workstations. Once a script has completed all workstations, the Test Administrator may re-issue that script (i.e., return the script to routing in the workflow) for the next test run. Controlling workflow also includes restarting or reinstating a script back into the workflow after resolution of a problem.

The Test Administrator has several reports available for use during the test. The reports have been designed to automatically provide test data to the Administrator to facilitate decision making and test control.

The archival function of YTRA deletes a test from the script tracking system (YTRK). When a test is deleted, system reports are normally printed to archive the files.

Figure 2:
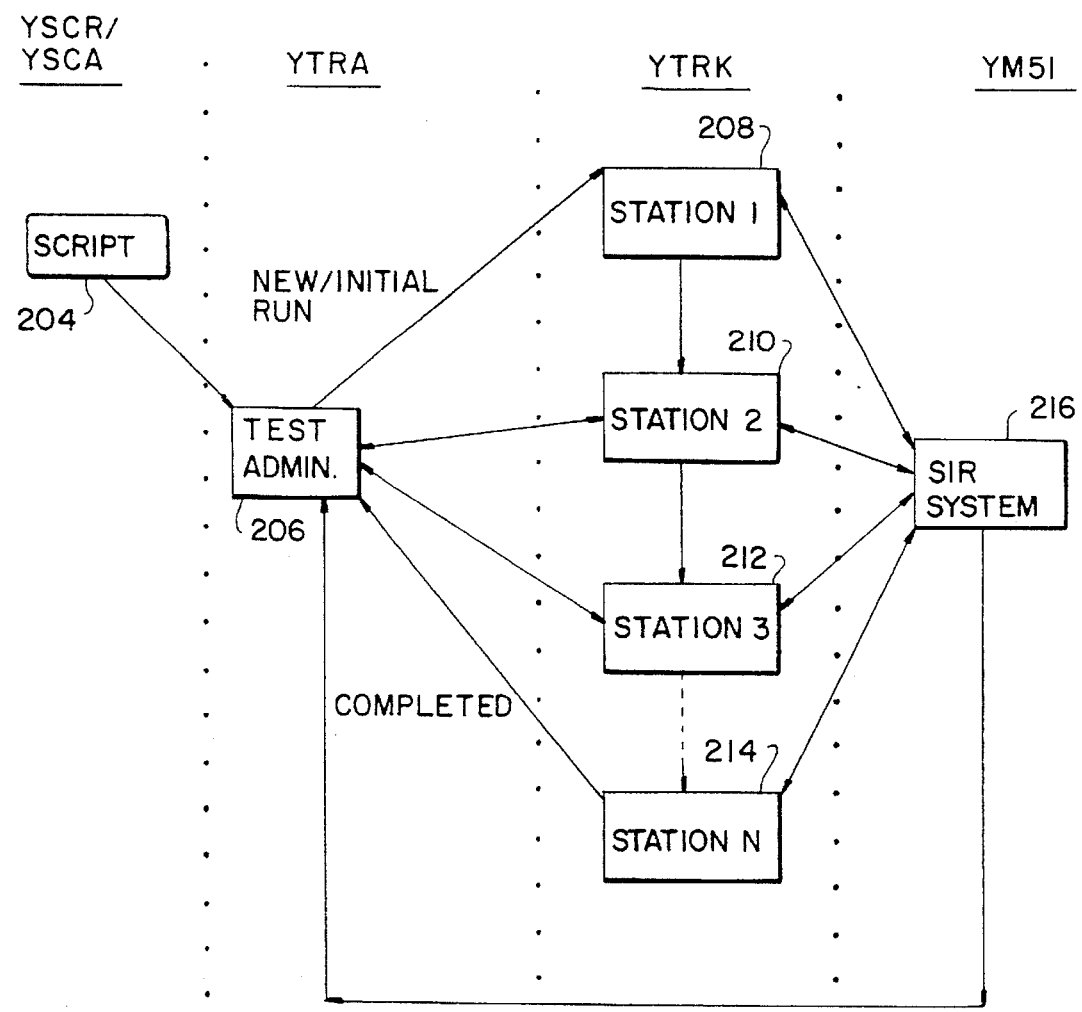
FIG. 2 is a high level flow diagram of the interrelationships between the main component parts of a preferred embodiment of the present invention.

FIG. 2 shows the relationships between YSCR, YSCA, YTRK, and YTRA. YSCR and YSCA are both concerned with the creation and maintenance of scripts represented generally as block 204. Any authorized system user can create a script. With proper authorization, users can also modify existing scripts. Typically, only the Script Administrator can use the functions available in YSCA.

YTRA is used to create tests, manage tests, report test progress and create archives of test results all utilizing the scripts created by YSCR. The functions available in YTRA would ordinarily be used only by a Test Administrator represented generally by icon 206.

Sub-system YTRK routes individual scripts to the proper workstations in the proper order during a test run. The workstations used during a test are represented generically by the icons labeled 208, 210, 212, and 214. If a tester detects an error in a script or in the test results, YTRK allows the tester to record and report the error to the Test Administrator. In the preferred embodiment, the error is recorded and reported using an SIR System (represented by icon 216) described above. A tester may also indicate that a script should be put on hold if the error is of a nature that continued routing of the script is either not desirable or not possible.

Figure 3:
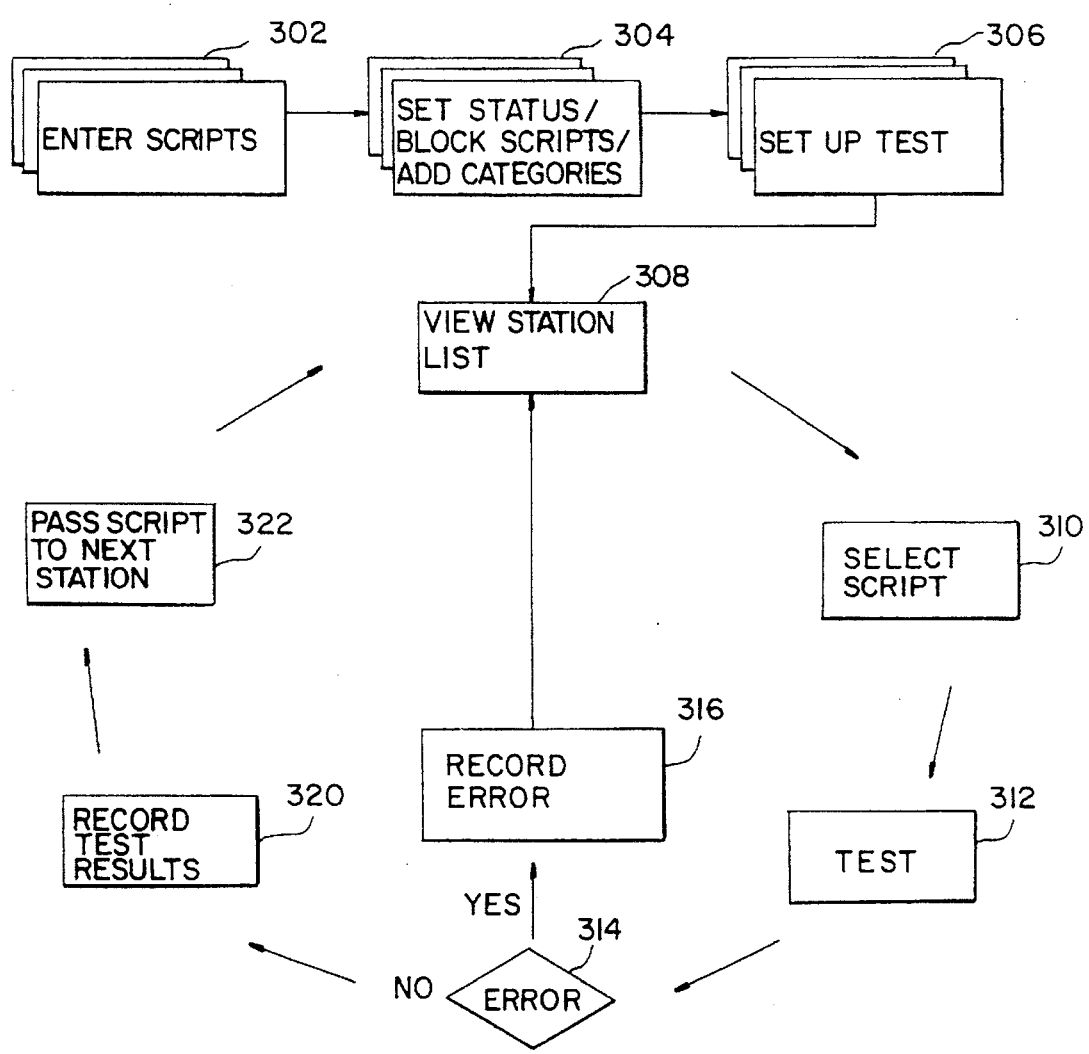
FIG. 3 depicts the general flow of the system for a preferred embodiment of the present invention.

FIG. 3 is a flow diagram for a preferred embodiment of the system of the present invention. FIG. 3 depicts the general flow of the system.

Using the YSCR sub-system, scripts can be created by a user or tester as indicated by the icon labeled 302. YSCA permits the Script Administrator to set the script status (e.g., new, active, closed, hold), blocking indicator (limiting the access to a script) and category. The Script Administrator can also perform the functions of copying and deleting multiple scripts through the YSCA sub-system. These administrative functions are represented by the icon labeled 304.

The YTRA sub-system provides a Test Administrator with a means for identifying the scripts for a specific test, initiating a testing process, monitoring the progress of the test, and resolving errors related to the scripts. Those functions are represented by the icon labeled 306. Access to YTRA is preferably restricted to the individual(s) playing the role of "Test Administrator".

The YTRK sub-system facilitates the remote testing process. YTRK automates and controls the testing procedure and is used to record all required information (e.g., information entered by a tester at a workstation). The functions performed within YTRK am represented by the icons labeled 308, 310, 312, 314, 316, 320, and 322. The normal testing procedure includes: selecting (steps 308,310) a script for routing; executing (step 312) the test at the routed workstation; recording (steps 314,316,320) any errors and/or test results; and passing (step 322) the script on to a next workstation at the completion of the test at the current workstation.

Selecting the script for testing requires a tester at a workstation to first view (step 308) the list of scripts available for testing at his workstation and then select (step 310) one of the listed scripts. Running or executing (step 312) the test requires the tester to follow the instructions provided in the script.

Recording the test results and/or any errors includes three steps. First, the tester must determine if any errors (either in the script itself or in the computer system being tested) have occurred during execution of the script. If an error is detected in the computer system, the tester records the error in the tracking system (YTRK). In a preferred embodiment, YTRK will automatically invoke SIR System 316 for this purpose. If there is an error in the script data, or other problem, the tester can send the script to the test administration. If no errors are detected during the execution of the script or if an error is found but the script can continue the routing, the tester records (step 320) script test result (e.g., document numbers for an invoice, an error number, reason for hold, etc.) and any other information requested in the script.

After the information has been entered the script is "checked-in" by the tester. YTRK then passes (step 322) the script to the next workstation in the routing order. The user is then free to view (step 308) the list of scripts waiting to be executed at his workstation, select (step 310) a next script from that list, and then execute (step 312) the selected script.

b. Format of a Script

As set forth above, the basic elements of a script include routing information, tester instructions, and any necessary testing data. Other data may be included in a script as required for a particular testing application. For example, a script used to test the SAP system contains many sections of data. These sections are discussed below to provide an example of a script format.

ROUTING/PROCEDURES

Each script has a predetermined script routing. The mute is the consecutive list of workstations a script must pass through in order for it to be fully executed. When a script is created, procedures (step by step instructions), are entered for each workstation. The system builds the routing based on the procedures entered. As a workstation completes the script the route list is "checked off". This provides a script tracking mechanism as well as a script workflow path.

NARRATIVE

This section describes the functionality of computer system which is to be tested by the script and the expected results in a narrative format. It is a guide to help the testers understand the test case and the expected results.

ORDER HEADER

This section contains all order header information necessary for entering a customer product order (i.e., order entry).

ORDER ITEM

This section contains all item (product) related information necessary for order entry.

ORDER ENTRY DOCUMENTS

This section provides a place to document an order number assigned by the SAP system and any other document numbers produced during order posting.

ORDER MANAGEMENT DOCUMENTS

This section provides a place to document the system assigned document numbers during the process of product distribution (e.g., delivery note number, shipment number, goods issue number, etc).

ORDER MANAGEMENT DIFFERENCES

This section contains predetermined information such as quantity, batch, bin and any differences therebetween. An example would be a quantity difference between the product picked for shipment and the product ordered.

INVOICES

This section provides a place to document SAP system assigned invoice work sheet and invoice numbers.

PURCHASE ORDER

This section contains information relative to the entry of a purchase order as well as a place for document number recording.

PRODUCTION ORDER

This section contains information relative to the entry of a production order as well as a place for document number recording.

RECEIPTS, ISSUES, TRANSFERS

This section contains information relative to inventory movement sub-systems and a place for document number recording.

PREP. DATA

This section contains information relative to preparatory data necessary to execute the script with a place for document number recording.

PROPERTY

This section contains all the information necessary to record a fixed asset item.

CASH MOVEMENTS

This section contains all the information necessary to record a cash movement for credit purposes.

INVOICES (FAS—Financial Accounting System)

This section contains the invoice header information and invoicing information relating to each item/product on the order.

VENDER INVOICE

This section contains all payable related data for vendor invoices.

PURCHASE ORDER (FAS)

This section contains the purchase order header information and financial information relating to each item/product.

FINANCIAL DOCUMENT

This section contains header information relative to the creation of financial documents.

FINANCIAL DETAIL ITEM

This section contains information relative to items within the financial document.

COST ACCOUNTING

This section contains cost accounting data.

INTERNAL ORDER

This section contains information relating to internal orders.

DIRECT COST & REVENUE PLAN

This section contains information relating to a Direct Cost and Revenue Plan for an item within the internal order.

ACTIVITY USAGE & RESOURCE PLAN

This section contains information relating to an Activity Usage & Resource Plan for an item within the internal order.

PRINT SEQUENCE

This section stores the information that directs the order in which the sections of the script are printed. The print sequence standardizes the format of the printed script to facilitate their use by testers.

MISCELLANEOUS

This section contains special information that is not part of any other defined section.

c. The Databases and Tables

In the preferred embodiment, the databases and tables are customized for the testing of the SAP system. However, the script system was developed to be flexible in adding, removing and adjusting the script structure to meet future and varying testing requirements. This can be done with limited programming effort (see script information control table 109).

The databases and tables, customized to the testing of the SAP system, are now described below as an example. As illustrated in FIG. 1, all four components of the SIS are integrated and use script information that is stored in an SAP database 110 in database files 112, 114, and 116. The purpose and structure of the three database files 112,114,116 are detailed below.

1. Script Header File 112

The Script Header File 112 stores all descriptive information pertaining to a script. Every script will have a header record. Each header record contains the following sections.

Script Identification (KEY): This identifies the script and script-set. There are four types of scripts: 1) Standard, 2) Dependent, 3) Multi-part, and 4) Dependent/Multi-pan. Standard scripts stand alone and are not related to nor dependent on any other script. Dependent scripts are used where one script is dependent on the complete execution of another script. Multi-part scripts are defined where multiple sets of information are required to define the complete business scenario. Dependent/Multi-pan scripts are a combination of dependent and multi-part where a dependent script has multiple sets of information.

The format of the script ID identifies what type of script is created and must pass a series of validation rules. 1) The first four positions are required and must be numeric. They identify the ID of the script set. 2) The fifth position, if entered, must be alphabetic or a dash. If this position is alphabetic, it identifies the script as dependent and defines the order of dependency. If it is a dash, the script is a multi-pan. If it is blank, then the script is standard. 3) The sixth position, if entered, must be numeric (1–9) and can only be entered if the fifth position is non-blank. Also, if the fifth position is a dash, the sixth position is required. If the fifth position is alphabetic and the sixth position is filled in, then the script is a dependent/multi-part. 4) It is not valid to mix types of scripts within a script set. For example, if script 3001 already exists, then script 3001A (a multi-part script) cannot be created and visa-versa.

The Script ID is "smart" in the sense that all four system components evaluate the format of the ID to drive their respective processing. Such processing is outlined where necessary.

Creation Date: The date when the script was originally entered in the system.

Owner: The user-id of the person who is responsible for the script information. Usually, it is the person who actually entered the script in to the system.

Date of Last Update: The date when the last update was applied to the script information.

Owner of last Update: The user-id of the person who applied the last update to the script information.

Current Section: The identifier of the sections currently defined for the script.

Narrative Number: The text narrative number assigned to this script. The narrative number is derived from the script ID. Refer to the section describing the script narrative for more information about the derivation of the script narrative number.

Recap: A brief overview of the script's functionality and purpose.

Notes: Special information pertaining to a script that is not related to the functional aspects of the script.

Status: The current state of the script; "new", "active", "canceled", etc. The valid status codes are defined in script and test status definition table 105, discussed below.

Blocking Indicator: This field, when set ON, prevents updates from being applied to the script. Usually the blocking indicator is set ON when the script is being tested.

Print Sequence: Defines the sections and order of presentation when the script is printed. The print sequence identifies which sections are printed by their corresponding section code.

Current Default Print Sequence: The print sequence that is used unless a specific print sequence is entered for that script.

Categories: A script category is a means for grouping similar scripts. Scripts may be grouped by functionality, area, or test (to name a few). A script may have a maximum of twenty-five categories assigned. The valid category codes are defined in a script category definitions table 107, discussed below.

Order Item Count: The current number of order items defined for a script.

2. Script Section File 114

The Script Section File 114 stores all data relating to the functional aspects of the business scenario. Each record on the file contains data relating to a single script section. A script may not have associated section information. Each record contains the following sections:

Script Identification (KEY): See script header file 112 discussed above.

Section Identification (KEY): Each script section has an associated identification code which is used to separate and store the information on the system.

Sequence Number (KEY): Some script sections may have multiple occurrences, for example a script may have many order items. This field allows for multiple records of information within a given section.

Section Information: This is a free-format area for the storage of the section information. The information stored in this file is controlled by a script information control table 109, discussed below.

3. Script Procedures File 116

The Script Procedure File 116 stores all data relating to the procedures required to execute the script. Each record on the file contains data relating to a set of procedures associated with a specific workstation. Each record contains the following sections.

Script Identification (KEY): See script header file 112 discussed above.

Workstation Identification (KEY): Identifies the workstation for which the set of procedures are defined. Workstations are defined in a workstation definitions table 103, discussed below. Only workstations that are defined in the procedures may have workstations defined in the routing.

Workstation Routing Sequence (KEY): Identifies the specific routing sequence for the specified workstation. This is required because a script may return to a workstation more than once and a set of procedures applies to a specific workstation performing a specific set of tasks.

Sequence Number (KEY): A set of procedures may have more than one "page" of information. This field allows a user to define multiple "pages" of procedures for a specific workstation.

Procedure Information: This is a free-format area for the storage of the procedure information.

There are also several SAP tables which support all of the activities of the script system components. They are outlined below.

4. Script Information Control Table 109

Defines the record format for every section of the script information. The table specifies the fields and their corresponding length and displacements within the data area of the Script Section Information File 114. The table contains the following information.

Section Identification (KEY): See the discussion on the script section file 114 set forth above.

Subsection/Version ID (KEY): This field has two purposes. First, it allows a section that has too many fields to be subdivided. An example of this is the order item section. It is divided into item information and pricing information. The information for both subsections is physically stored on a single record but is displayed to the user on two separate screens. The subsection ID allows each screen to be defined separately while still relating to one record of information.

Second, when used as a version ID, this field is used when the information within a section needs to be reorganized. A section may be redefined using a different version ID. By executing the data reorganization facility developed for this system, the section information can be reformatted in the desired manner.

Field Sequence (KEY): Identifies the order of presentation and storage of the script section's information. (Presentation refers to the printing of information on the Script Print report).

Field Type (KEY): There are three types of fields that can be stored on a script section: 1) "Entry", 2) "Data", and 3) "Object". "Entry" fields are used to tell the reporting modules that a blank line is to be printed if the corresponding data field does not have a value. For every "entry" field, there must also be a data field. "Data" fields are the fields that store the script information. "Object" fields were developed in conjunction with the miscellaneous section (Z) so that the user could enter the desired field description.

Object Name: Every piece of information defined for a section has some level of description. Many of these descriptions are store in SAP's Data Dictionary. The object name defined for a field corresponds to the Data Dictionary name. When the script information is printed, the data dictionary is read to retrieve the description of the field.

Field Displacement: This indicates the location of the field from the beginning of the section information.

Field Length: This indicates the length of the field.

Mapping Sequence: This field is used during data reorganization of the script information.

5. Script Tracking Information Table 111

The script tracking information table 111 stores each workstation's tracking record for every script included in a specified test. The table contains the following information.

Test Identification (KEY): Identifies a specific test. The Test Identification and run numbers are defined in a test identification definitions table 115.

Run Number (KEY): Identifies a specific run within a test.

Script Identification (KEY): See script header file 112 discussed above.

Iteration (KEY): Identifies a specific iteration for a script within a run and test.

Station Sequence (KEY): Each script follows a pre-assigned route of workstations. Every "stop" on the route has an associated routing sequence number. The workstation sequence corresponds to the routing sequence on the script information.

SIR Indicator—Script: This indicates whether the script has exposed an error in a previous workstation but was not severe enough to prevent the script from continuing through the test process.

SIR Indicator—workstation: This indicates whether an error has been discovered at the current workstation.

Status: The status is a indicator which is used to track the progress of the testing process at a workstation. The valid status codes are defined in a script and test status definitions table 105.

Tester ID: The user ID of the person testing the script at a given workstation.

Arrival Date: The date the script arrived at the workstation.

Arrival Time: The time the script arrived at the workstation.

Start Date: The date the test process began for a script at the workstation.

Start Time: The time the test process began for a script at the workstation.

Exit Date: The date the test process was concluded for a script at a workstation.

Exit Time: The time the test process was concluded for a script at a workstation.

Testcenter: The geographical location of the tester. Test centers are defined in a test center definitions table 121.

Reinstate Count: A count of the number of times the script was reinstated by the Test Administrator at this workstation.

Priority Indicator: If the script is a priority script, this indicator is set so that the script is displayed at the top of the list for processing first.

6. Document History Table 113

A document history table 113 stores all of the information (i.e., results) recorded by testers for a script during the course of a specified test. As a script is processed, the tester records various forms of information including documents such as order number, delivery note, shipment, invoice, etc.. This information is made available to subsequent workstations. The table contains the following sections.

Test Identification (KEY): (See table 111)

Run Number (KEY): (See table 111)

Script Identification (KEY): (See table 111)

Iteration (KEY): (See table 111)

Document Sequence (KEY): This field is incremented, each time a document is posted to the table. It allows multiple documents to be entered at one workstation.

Document Type: This field identifies the type of document being entered. The document type codes are defined in a document type code definition table 119.

Document Number: As the tester executes the script and posts orders and other information, SAP returns document numbers to be recorded within the script system. This field is used to store the information returned from SAP.

Miscellaneous Information: This field is used to store any miscellaneous information concerning the document.

Workstation Identification: This field contains the ID of the workstation that is posting the document information.

Tester Identification: This field contains the ID of the tester posting the document information.

Document Date: This field contains the date on which the document was posted to the table.

Document Time: This field contains the time when the document was posted to the table.

Testcenter: (See table 111)

Station Sequence: (See table 111)

7. Workstation Definitions Table 103

This table defines all the valid workstations and their associated descriptions. The table contains the following entries.

Language Indicator (KEY): This table is language dependent. Therefore, the workstation descriptions are displayed in the language that is standard for a region.

Workstation Identification (KEY): This entry is a code/abbreviation which represents a specific workstation.

Workstation Type: This entry indicates whether the workstation is a regular workstation or an SIR desk.

Description: This entry is a description of the workstation.

Document Entry Required Indicator: This entry indicates whether documents must be entered at a workstation during the testing process.

Priority Sequence: This field is used to order the workstation information on screens.

8. Script and Test Status Definitions Table 105

The script and test status definitions table 105 defines all of the possible script status and tracking status codes. Script status codes define the state of the script (new, active, held, canceled). Tracking status codes define the current state of a script at a given workstation (in-progress, In-error, etc.). Each status code has an associated description. The tracking status codes used by the system as listed below.

General Statuses: S—Start script at initial workstation, B—Script in workstation's In-Basket, I—Script In-Progress at workstation, D—Documents entered, and C—Script complete at workstation.

Problem Statuses: X—SIR entered, documents pending workstation.

Administrative Statuses: E—Error found, SIR recorded/script held; T—Error fixed, script restarted; H—Script held, sent to Test Administrator; R—Script removed from test; F—Script finished run; and P—Script run complete, DEPENDENT script started.

Script and test status definitions table 105 contains the following entries.

Language Indicator (KEY): This table is language dependent. Therefore, the status descriptions are displayed in the language that is standard for a region.

Type Code (KEY): A status code can be used to identify the state of a script or the state of testing for a script at a workstation. This code identifies which status codes apply to scripts and which apply to testing.

Status Code (KEY): A code representing a specific script or test status.

Description: The description of the status code.

9. Test Identification Definitions Table 115

The test identification definitions table 115 stores the information regarding what tests are currently defined.

Test Identification: As the Test Administrator initiates a test, defining the ID of the test is part of the process. The test ID is used to identify a specific test. Every tester who is involved in the test process is required to identify which test they are working with, since many tests may be in progress at the same time.

Run Number: Each test may have many runs. This defines the runs that have been created for a specific test.

10. Document History Information Table 119

The document history information table 119 defines all the possible documents type codes that may be entered into the system. Each code has an associated description.

Document Type Code: A two character ID corresponding to a specific document type. Documents types include order numbers, invoice numbers, shipment numbers, etc.

Description: The description of the type of document.

11. Testcenter Definitions Table 121

The testcenter definitions table 121 defines the valid geographical test locations.

Testcenter: A testcenter is a general location or area where the testing is taking place. One testcenter may be in the U.S. and another in Canada. This field provides a method of identifying all possible test centers.

Description: The description of the testcenter

12. Script Category Definitions Table 107

The script category definitions table 107 defines all of the valid category codes that may be assigned to a given script. Each category code has an associated description.

Category Type: This field Identifies a particular method of grouping scripts together. A category type may be used to group scripts by functional purpose, area of responsibility, or test.

Category Code: This field is a five digit code which is assigned to each category.

Description: This field contains a description of the category code.

13. Function Control Table 117

The function control table 117 defines the valid PFkey usage and associated function codes for each screen within the system.

II. SCRIPT MAINTENANCE AND CREATION SUBSYSTEM (YSCR)

a. Purpose

The Script Maintenance and Creation ("YSCR") subsystem of SIS provides a means for creating, storing, retrieving, and updating the script information. YSCR is a menu based or menu-driven sub-system Each menu allows the user to specify a script and direct the processing to the desired section or function. The sub-system may be used by anyone who is involved in the creation and testing of scripts. YSCR is used to create and maintain all scripts.

The YSCR sub-system enables the user to enter all relevant script information, including routing information, script narrative, a recap of the script and all necessary data for testing. In addition to the entry of information, this sub-system proposes the next available script number and also offers reporting and copy/delete features.

b. Sub-system Functions

The script information is created and maintained through a series of menus preferably presented on a video display screen of a terminal. Each menu is responsible for a particular grouping of script sections. When a section screen is invoked, all fields and data previously entered are displayed (If the section does not exist, the fields are displayed with no data). The user has the option to invoke another section or add/update/delete the information for the current section.

Each section of the script is assigned a one digit section ID. Script sections am referred to using this ID throughout some of the functions of the sub-system, such as copy, delete and print sequence. The function code is the section identifier preceded by an "S". Script sections and functions can be accessed using the function code, or a PFkey. The administrative section has a section ID of "Y". There is no function code or PFkey, as this section cannot be accessed through sub-system YSCR.

Figure 4:
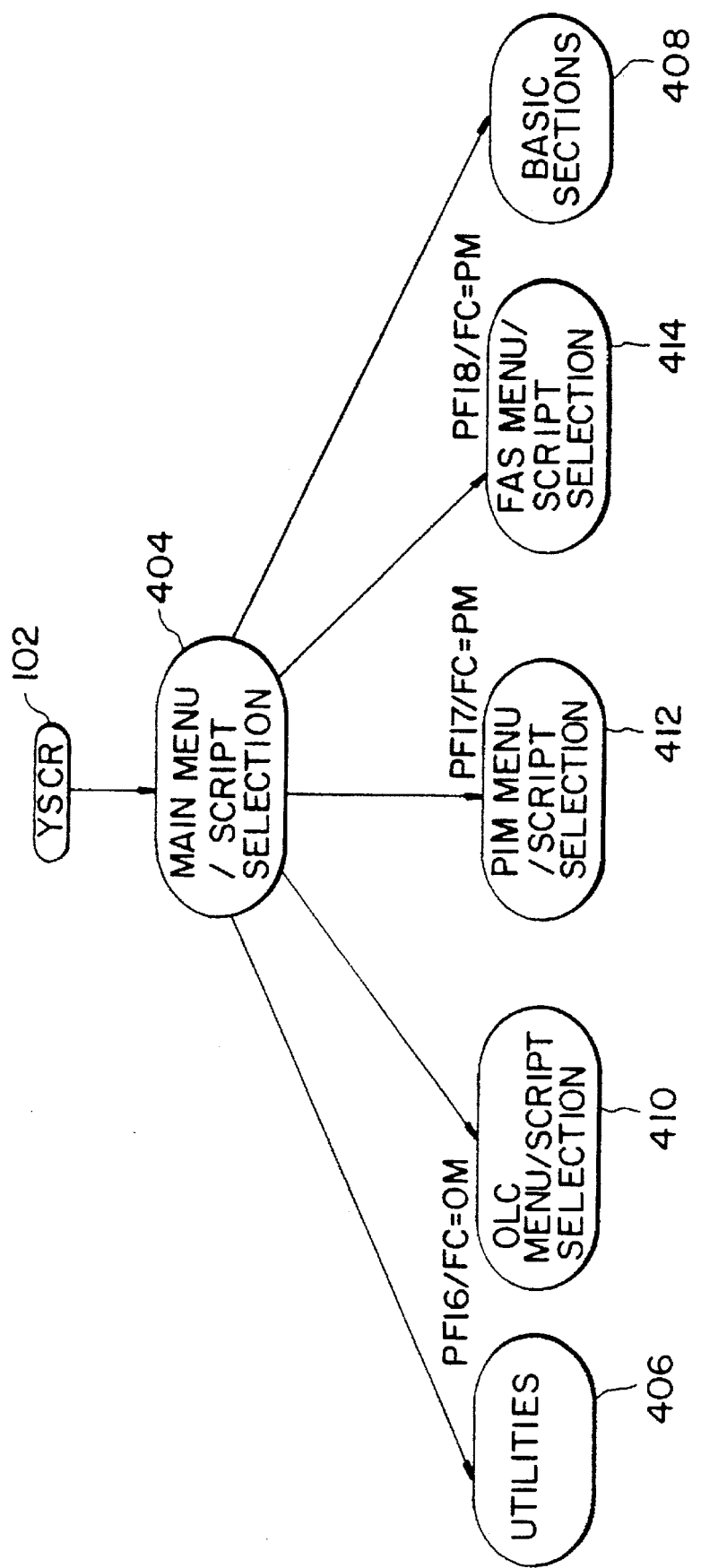
FIG. 4 depicts the initial menu selections available in sub-system YSCR in a preferred embodiment of the present invention.

As shown in FIG. 4, when a user at a terminal invokes YSCR 102, the main menu 404 is presented on the screen. Main menu 404 presents the user with a list of the PFkeys and Function codes to access all of the areas of a script as indicated in FIG. 4. Each of the areas is presented as a menu which permits the user to select the script section of interest. From main menu 404, the user may select any of the utility functions 406 or script basic sections 408. The user may also select an Order Life Cycle (OLC) menu 410, a Plant Information Management (PIM) menu 412, or a Financial Accounting System (FAS) menu 414. Each of the available selections is discussed below.

1. Basic Sections 408

Figure 5:
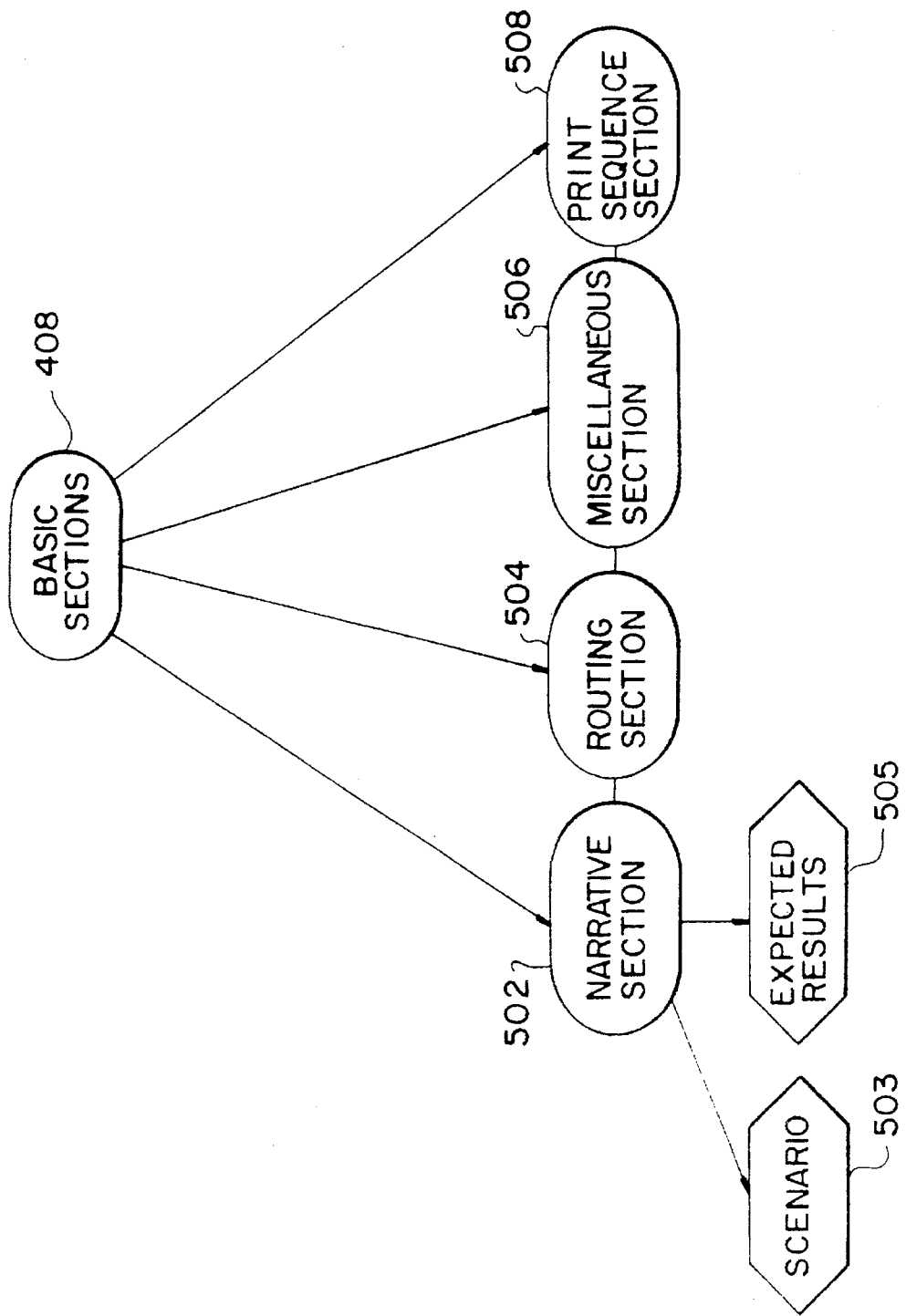
FIG. 5 depicts the menu selections and functions available from the BASIC SECTIONS menu in a preferred embodiment of the present invention.

The basic sections 408 of a script can be accessed and information can be entered in those sections from main menu 404 through the use of PFkeys or function codes. Each of the basic sections of the script, shown in FIG. 5, can be displayed on the screen of a terminal. These include narrative 502 (which includes Scenario 503 and Expected Results 505), routing/procedures 504, miscellaneous 506, and print sequence 508. In this manner scripts can be created, reviewed, or modified.

The narrative section 502 is a text section, and therefore, SIS uses the text processing capabilities of SAP to edit it.

2. Order Life Cycle ("OLC") Sections Menu 410

Figure 6:
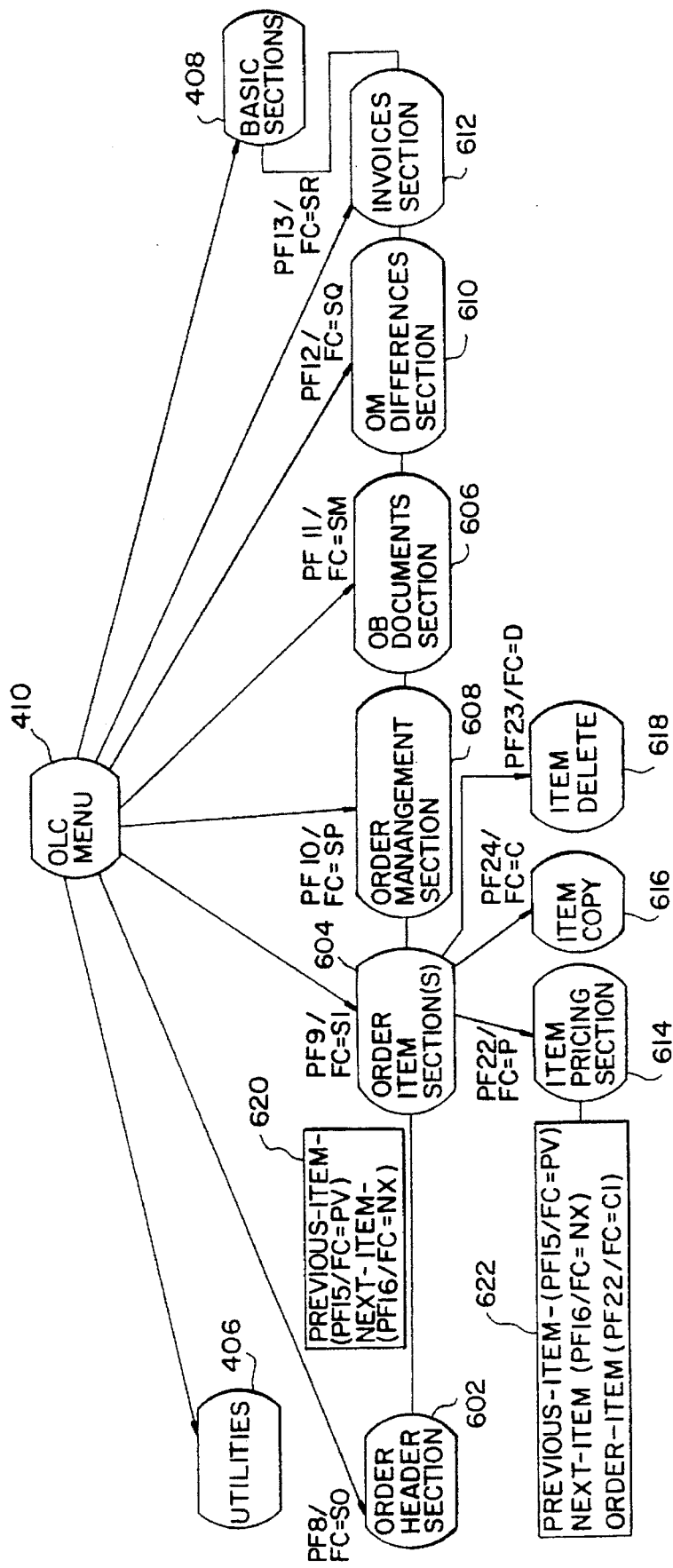
FIG. 6 depicts the menu selections and functions available from the OLC (order life cycle) menu in a preferred embodiment of the present invention.

Within the OLC menu 410 the user may review, create or modify any of the OLC sections of a script. The OLC menu 410 presents the user with a list of the PFkeys and Function codes to access all of the OLC sections as indicated in FIG. 6. Each of the OLC sections is presented as a screen or series of screens formatted to guide the user through the entering of data. The utilities 406 and the basic sections 408 can be accessed from the OLC menu 410.

The script sections which can be accessed from OLC menu 410 include an order header section 602, an order item section(s) 604, an order management section 608, an OE (order entry) documents section 606, an OM (order management) differences section 610 and an invoices section 612. From order item section 604, an item pricing function 614, an item copy function 616 and an item delete function 618 may be accessed.

Block 620 indicates functions which may be executed from order item section 604. Functions indicated in a block (e.g., block 620), will not cause a new screen to be displayed. Similarly, block 622 indicates functions which may be executed from item pricing section 614.

3. Plant Information Management ("PIM") Sections Menu 412

Figure 7:
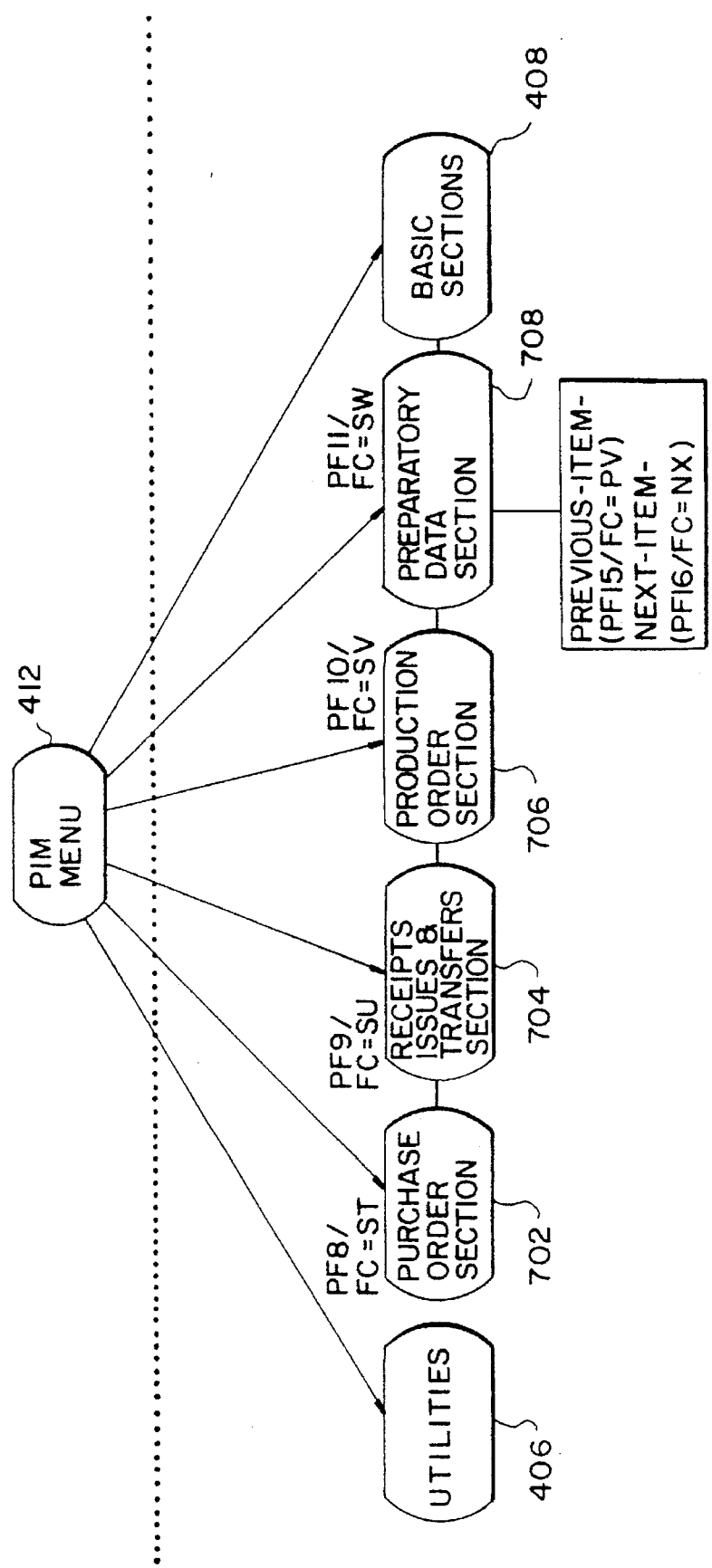
FIG. 7 depicts the menu selections and functions available from the PIM (plant information management) menu in a preferred embodiment of the present invention.

Within the PIM menu 412 the user may review, create or modify any of the PIM sections of a script. The PIM menu 412 presents the user with a list of the PFkeys and Function codes to access all of the PIM sections as indicated in FIG. 7. Each of the PIM sections is presented as a screen formatted to guide a user through the entering of data. The utilities 406 and the basic sections 408 can also be accessed from the PIM menu 412.

The sections which may be accessed from PIM menu 412 include a purchase order section 702, a receipts, issues and transfers section 704, and a production order section 706 and a preparatory data section 708. Block 710 indicates functions which may be accessed from preparatory data section 708.

4. Financial Accounting System ("FAS") Sections Menu 414

Figure 8:
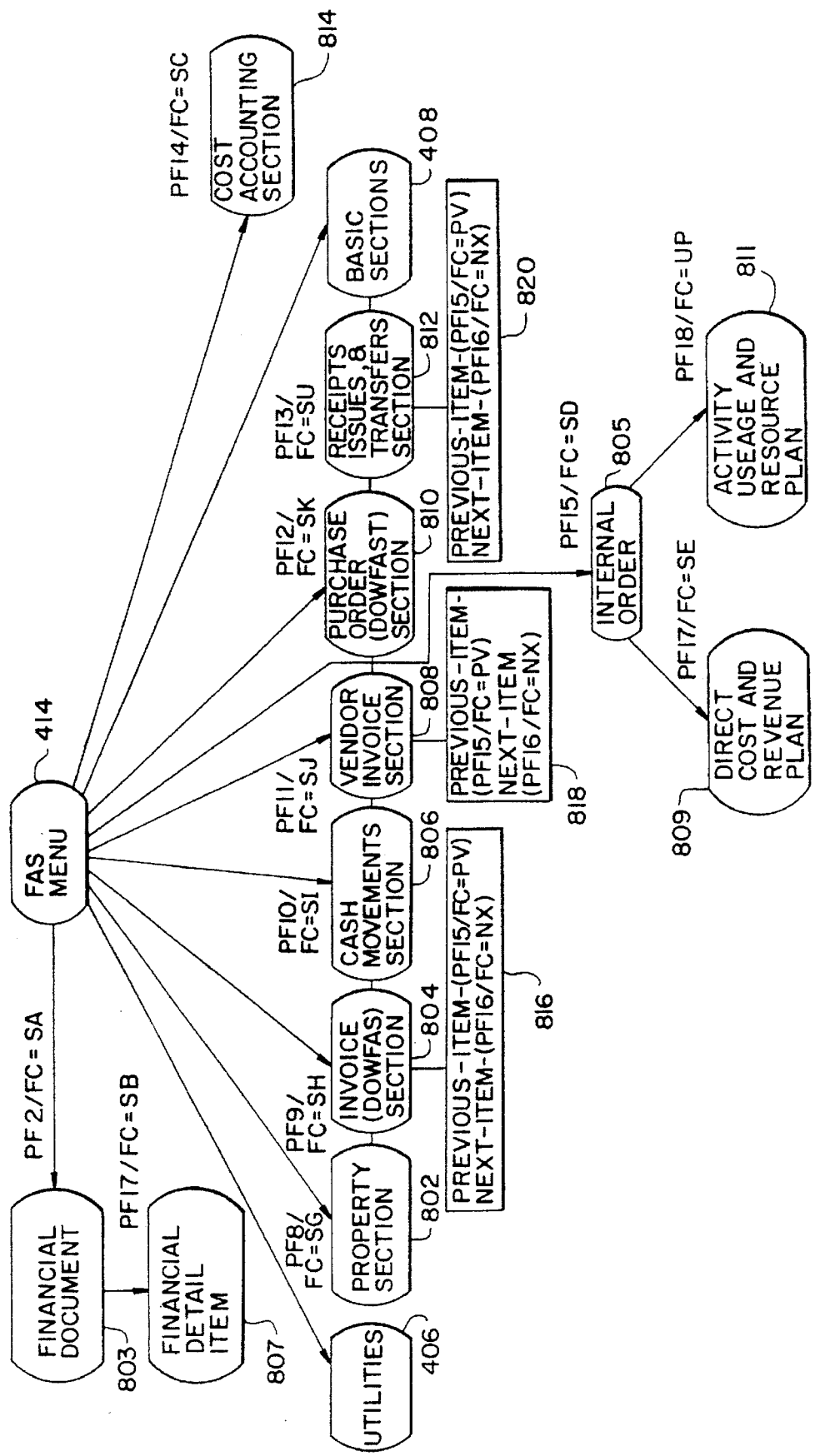
FIG. 8 depicts the menu selections and functions available from the FAS (Financial Accounting System) menu in a preferred embodiment of the present invention.

Within the FAS menu 414 the user may review, create or modify any of the FAS sections of a script. The FAS menu 414 presents the user with a list of the PFkeys and Function codes to access all of the FAS sections as indicated in FIG. 8. Each of the FAS sections is presented as a screen formatted to guide the user through the entering of data. The utilities 406 and the basic sections 408 can also be accessed from the FAS menu 414.

The sections which may be accessed from the FAS menu 414 include a financial document section 803, a financial detail item section 807, a property section 802, an invoice (FAS) section 804, a cash movements section 806, a vendor invoice section 808, a purchase order (FAS) section 810, a receipts, issues and transfers section 812, an internal order section 804, and a cost accounting section 814. A direct cost and revenue plan section 809 and an activity usage and resource plan section 811 may be accessed from the internal order section 805. Further, blocks 816, 818, and 820 indicate the functions which can be accessed from section 804, 808, and 810, respectively.

5. Utilities 406

Figure 9:
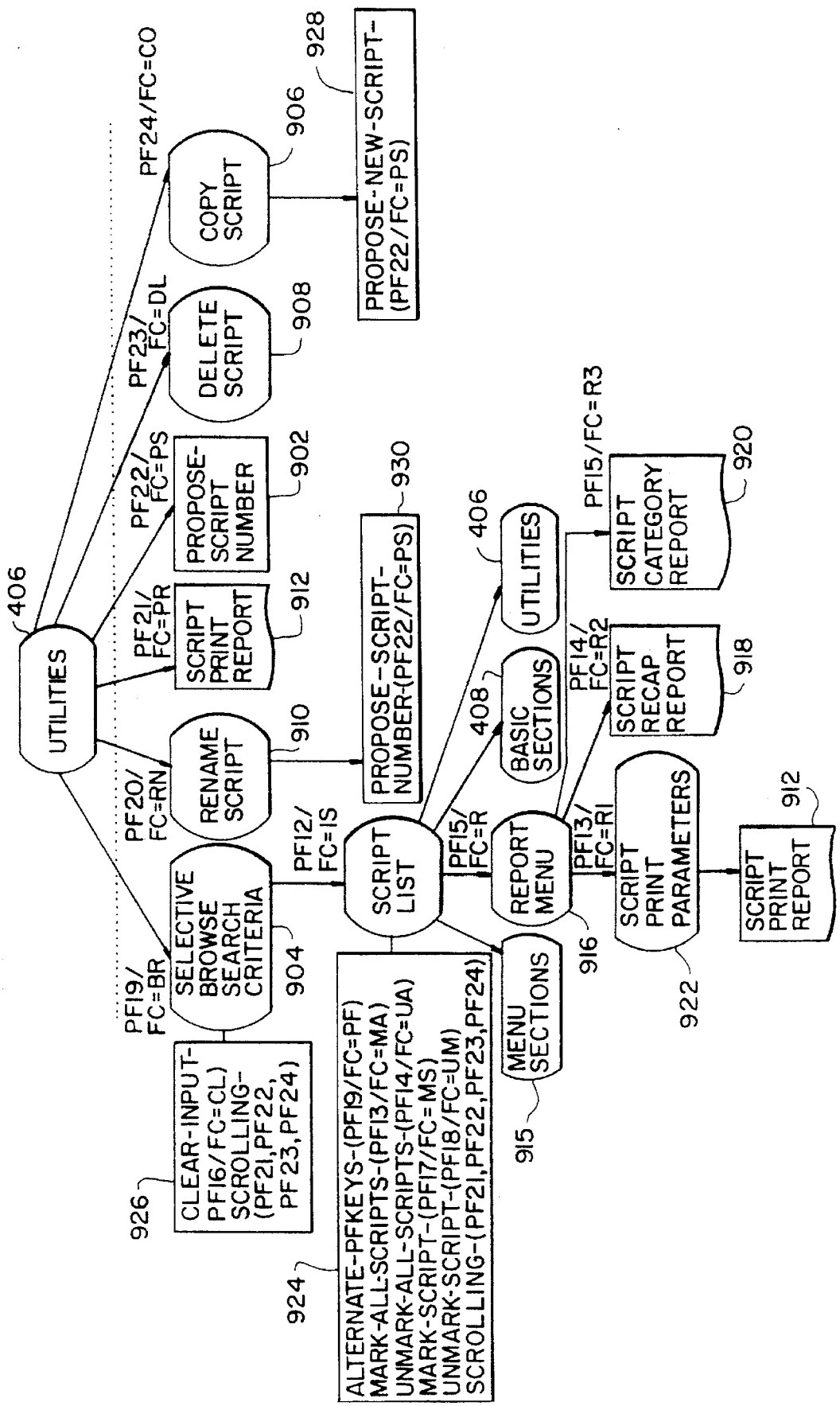
FIG. 9 depicts the menu selections and functions available from the UTILITIES menu in a preferred embodiment of the present invention.

Listed below are the utilities 406 available in YSCR to enable a user to perform functions associated with creating and maintaining scripts. The organization and relationships of the utilities is shown in FIG. 9. All of these functions can be accessed from the main menu 404 and from each of the group menus 410, 412, and 414. A brief description of each utility or function is provided below.

Propose Script Number 902: This utility searches the script database 110 (from a user-specified point) and returns the next available script identification.

Copy Script 906: This utility copies the specified contents of a script to a new script identification. The script may be copied in part or in full. Block 928 indicates a function which may be entered from copy script 906.

Delete Script 908: Deletes the specified contents of a script. The script may be deleted in full or only partially.

Rename Script 910: Renames all associated components of a script to the specified script identification. Block 930 indicates a function which may be entered from rename script 910 which will not result in display of a new screen.

Print Script 912: Invokes routines to print the contents of the script in a formatted list.

Selective Browse 904: This utility searches the current script information and returns a list of scripts 914 that meet a user-specified set of criteria. (For example: A user may need to view all scripts that have been created with a company code equal to "02".) The Selective Browse function enables the user to view a list 914 of scripts that match the selected criteria.

Block 926 indicates functions which may be entered flora selective browse 904 which will not result in display of a new screen.

List 914 displays the script number, sections included in the script, and a recap of the narrative. From this list, the user can enter utilities 406, basic sections 408, or a report menu 916. In addition, the user may re-enter the menu (indicated by menu sections icon 915) from which the browse utility was invoked. A block 924 indicates functions which can be accessed from script list 914 which will not result in display of a new screen.

Report menu 916 allows generation of a script recap report 918 or a script category report 920, or printing of individual scripts print reports 912 via script prim parameters function 922.

The Script Recap Report 918 prints a list of all the scripts in the given range that match the selection criteria entered. The list includes the script number, the script status and the recap information. The Script Category Report 920 lists the script number, the script recap and the category codes assigned to each script. Both of these reports can be selected from report menu 916. These reports produce a hard-copy version of the script information for a list of selected scripts. Only those scripts that have been "marked" in the script list are passed and printed on this report. Each system has its own version of the Script Print Report.

e. Script Database Access/Update

The Data Entry System has many screens that process script section information. All reading and updating of information has been developed in a common routine to facilitate adding and removing script sections and information.

III. SCRIPT ADMINISTRATION SUB-SYSTEM (YSCA)

a. Purpose

Figure 10:
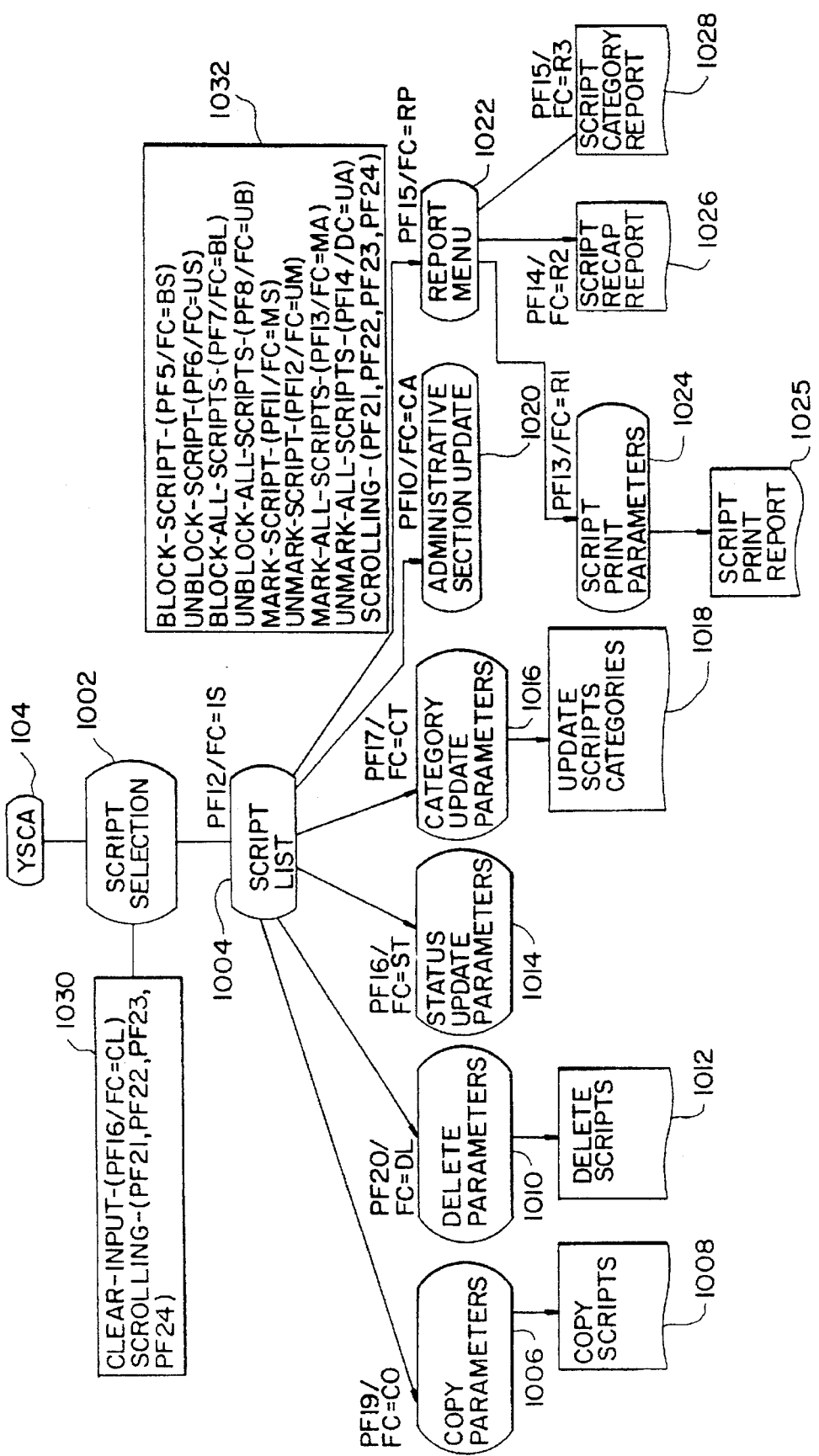
FIG. 10 depicts the initial menu selections available in sub-system YSCA in a preferred-embodiment of the present invention.

The Script Administration Sub-system (YSCA) 104 provides a means for applying mass updates to the scripts. The functions provided by YSCA are depicted in FIG. 10. YSCA 104 is used to manage/maintain a large number of scripts. YSCA 104 enables a Script Administrator to maintain individual or a range of scripts by status, blocking indicator and categories. An informational recap of the selected scripts along with reporting functions are provided to aid in the identification of scripts. In addition, the sub-system provides mass copy and delete functions and mass updates of status, blocking indicators and categories. Due to the critical nature of this sub-system, access is limited to the individual(s) playing the role of "Script Administrator".

Figure 11:
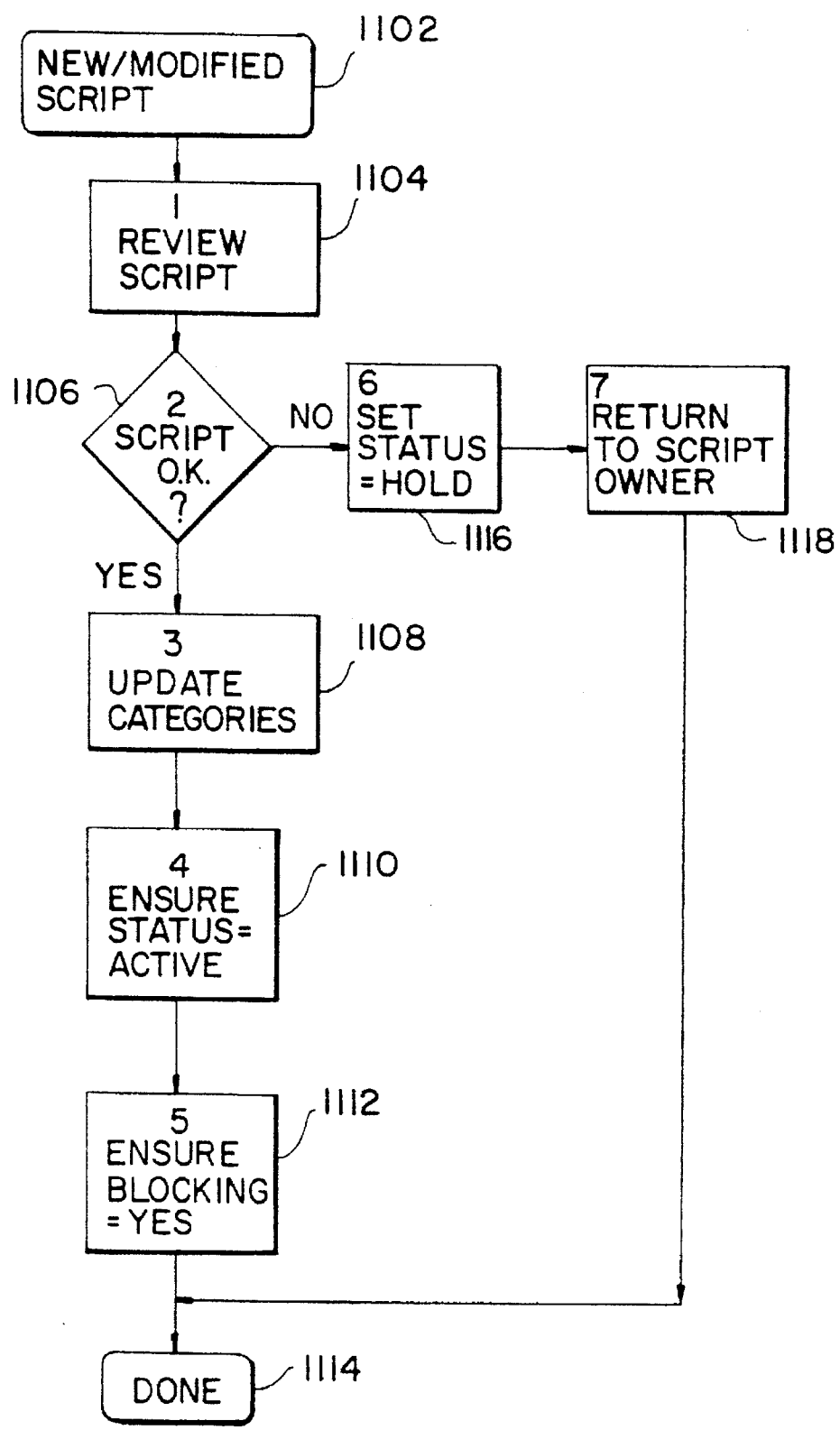
FIG. 11 is a high level flow diagram of the general flow of the sub-system YSCA for a preferred embodiment of the present invention.

In general the Script Administrator uses YSCA 104 to control and regulate access, modifications and release of scripts. Referring to FIG. 11, an example of the operation of YSCA 104 in reviewing and releasing a new script 1102 is provided.

A new or modified script 1102 is submitted by a tester for review by the Script Administrator at a step 1104. The Script Administrator determines if the script is acceptable (i.e., in condition to be released for use in testing) at a step 1106. If the script is acceptable, the Test Administrator updates any categories for that script that need to be updated at a step 1108, changes the status of the script to active at a step 1110 so that the script can be used in a test, and ensures that blocking is on for the script at a step 1112 so that it cannot be further modified. Block 1114 indicates that the task of the Test Administrator are then completed with respect to the new script 1102.

If the script is found to be unacceptable at step 1106, then the status of the script is set to hold at a step 1116. At step 1118, the script is returned to the tester who created or modified it so that it can be corrected.

b. Sub-system Functions
  1. Overview

Each of the functions provided by YSCA 104 are invoked from a script list 1004 presented to the user as shown in FIG. 10. After invoking YSCA 104, the user is presented with a script selection screen 1002. The user may define the criteria for a collection of scripts (the script list) by making the appropriate selections in the script selection screen 1002. The script list 1004 is defined by the use of selection criteria including script number range, status, blocking indicator, category codes, script section, script owner, recap text, person who last updated script and date of last update.

Block 1030 indicates functions which may be executed from script selection screen 1002, which will not result in the display of a new screen.

After the user has selected the criteria for the script list, the script list 1004 is generated by activating the appropriate PFkey or entering the Function code and displayed for the user. While the script list 1004 is displayed, the user can block, unblock, mark, and un-mark all or selected ones of the listed scripts. All of the functions below are performed only for the scripts that have been selected. Each of the functions described below is accessed from the script list 1004 through the use of the appropriate PFkey or Function code.

Mass Copy 1006: The mass copy function creates a duplicate set of selected scripts starting at a specified script number. The scripts can be copied with or without the categories. There are two types of copy functions available. A "direct" copy copies the selected scripts to the specified range and overlays any current scripts within the range. A "relative" copy copies the selected scripts but bypasses any current scripts within the range and finds the next available script number. The Test Administrator has the option to perform, cancel or simulate the copy. The sub-system then produces a report 1008 detailing the results.

Mass Delete 1010: This function deletes a selected set of scripts (including all related script information and narratives). The user has the option to perform the delete, cancel the delete or simulate the delete. The sub-system produces a report 1012 detailing the results.

Mass Category Update 1016: This function either adds or removes a specified category code to a selected set of scripts. The sub-system then produces a report 1018 listing the results of the update.

Mass Status Update 1014: This function changes the script status of a selected set of scripts to a specified value.

Administrative Section Update 1020: This function provides a means for the Script Administrator to update the status, blocking indicator, and category information for a selected script.

Report Menu 1022: This menu is used to invoke routines to print the current contents of the script information in the following formatted reports.

Script Print Report 1025: This report includes the contents of the script in a formatted report as selected by script print parameters function 1024. From function 1024, the administrator can enter a test identification and run number to print on the scripts so the testers can see on the script report in which tests the script will be executed.

Script Recap Report 1026: This report produces a list of selected scripts along with their recap information and status code.

Script Category Report 1028: This report produces a list of selected scripts along with their recap information and category codes.

Block 1032 indicates the other functions which may be performed from script list 1004. These other functions will not result in the display of a new screen (i.e., menu).

2. Status, Blocking and Categories

When a script is created, the administrative section (Section Y) is automatically assigned. The sub-system assigns a status of N(ew), and a blocking indicator of N(o) to all newly created scripts. Categories are assigned by the Script Administrator.

The status indicator is represented as one of the following: N—New, A—Active, C—Canceled, H—Hold. This indicator is used to indicate which scripts are: active and ready to be tested; new and still in development; closed or canceled and will not be tested; or on hold, and will be tested at a later date.

Generally, when the status of a script is changed to active, the script will also be blocked. The active status represents that the data on the script is completed, and the script is ready for use. Therefore, the script in most cases is blocked to prevent alterations of data. The Script Administrator always has the capability to unblock and modify a script.

The blocking indicator is either Y(es) or N(o) indicating whether or not the script is blocked. When a script is blocked, the data cannot be altered. However, each section of the script can be viewed just as an unblocked script. Also, the script can be printed or copied. It cannot be deleted. If a blocked script is copied, the new script is not blocked and the original script remains blocked.

Categories should be set at the time the script is created. This enables the Script Administrator to easily identify the scripts by group. For example, a U.S. Area script has a category code of "USAR" and should be assigned that code at creation. When the Script Administrator wants to view all U.S. Area scripts, he would select the category "USAR" and the sub-system would display only those scripts.

When the script status is changed to active, the script should be reviewed and other category codes applied where needed. For example, if the script is an order life cycle script that is being tested in a particular test, categories corresponding to the test and to the type of script ("OLCYC") should be assigned to the script.

3. Mass Update Functions

The Script Administrator can copy a range of scripts, to another range. The copy features can be relative or direct. A direct copy replaces any scripts currently existing in the range selected to be copied to. A relative copy skips a number in a range if a script already exists in the selected range.

The mass delete function allows the Script Administrator to select a range of scripts and delete the entire script. Both the mass delete and the mass copy provide a report when the function is completed. In addition, both the mass delete and mass copy features allow the Script Administrator to run a simulation before processing actually occurs. If the simulation is run, a report is generated displaying the script changes that will occur when the function is actually performed. No changes are made to current scripts during the simulation.

Mass status, blocking and categorization enable the Script Administrator to select a range of scripts and change the status or blocking on all the selected scripts. Additionally, categories can be added or deleted for the selected range of scripts.

4. Reports

The Administrative Reporting function enables the Script Administrator to view a list of scripts that match the selected criteria. The list displays the script number, status and blocking indicators and a recap of the narrative. From this list, in addition to blocking, status and category updates, the sub-system provides flexible reporting capabilities.

In addition to printing the individual scripts, there are two types of reports that can be generated. The Script List Report prints a list of all the scripts in the given range that match the selection criteria entered. The list includes the script number, the status and the recap information. The Script Category List Report lists the script number, the script recap and the category codes assigned to each script.

IV. SCRIPT TRACKING ADMINISTRATION SUB-SYSTEM (YTRA)

a. Purpose

The script tracking administration (YTRA) sub-system 108 provides the Test Administrator with a means for initiating a testing process, identifying the scripts for a specific test, monitoring the progress of the test, and resolving errors related to the scripts. Access to the script tracking administration sub-system is restricted to individual(s) designated as "Test Administrator."

b. Sub-system Functions

Figure 12:
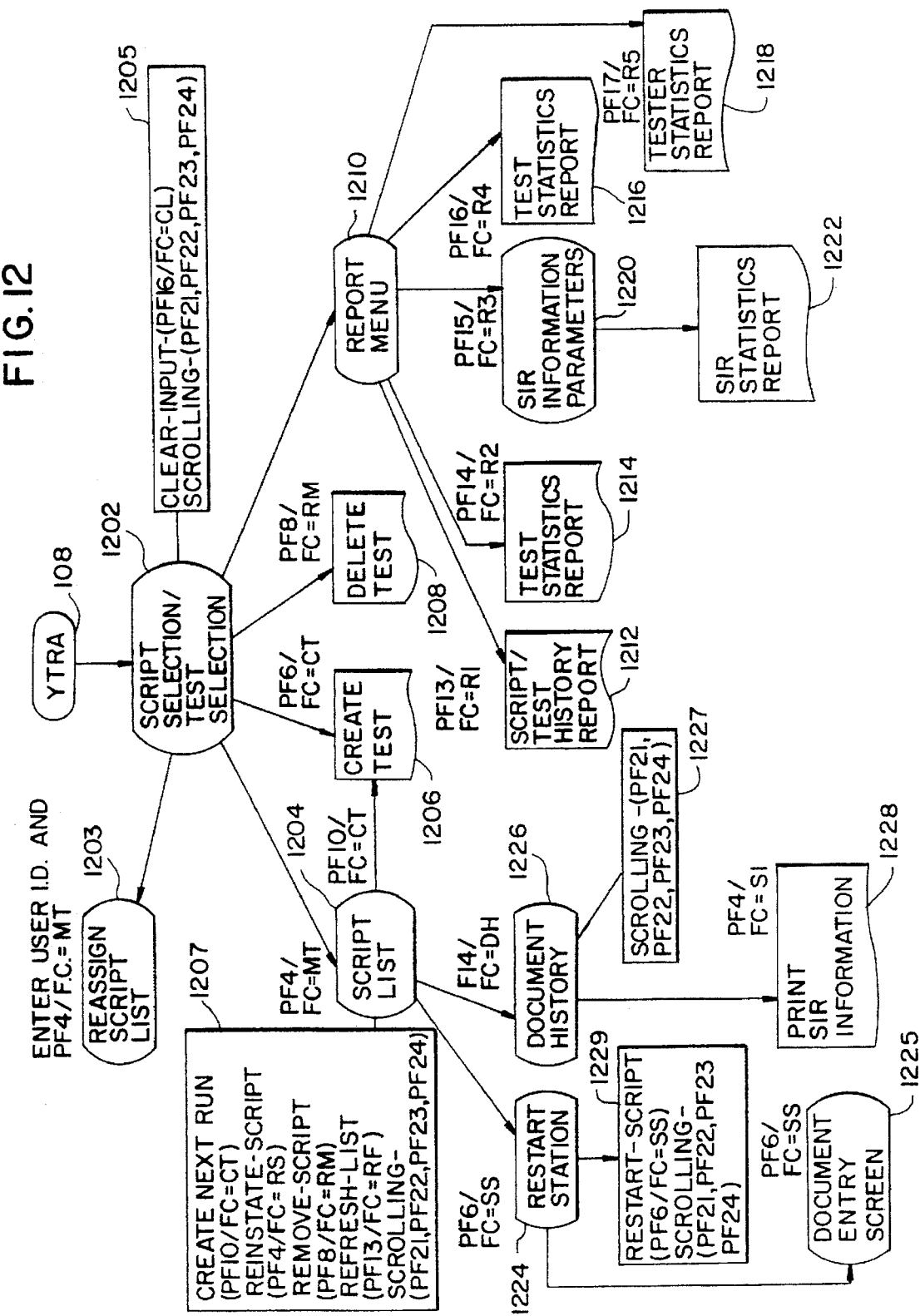
FIG. 12 depicts the initial menu selections available in sub-system YTRA in a preferred embodiment of the present invention.

The script tracking administration sub-system (YTRA) 108 provides administrative functionality to the script tracking sub-system (YTRK) 106. FIG. 12 is a high-level functional diagram of the script tracking administration sub-system 108. The functionality is illustrated in terms of access screens and system reports. A script section/test selection screen 1202 provides access to the following functions.

Reassign 1203: The Test Administrator has the power to "reassign" scripts that are currently assigned to a particular workstation. The reassign function changes the workstation which is responsible for a script. This prevents a set of scripts from being delayed due to a tester's absence.

Create Test 1206: This function defines a set of scripts to be tested. It prepares the necessary tracking information at the initial workstation for each script. Once this function has been completed, the test process may begin.

Delete Test 1208: Deletes all the associated tracking information for a specified test. The delete test function is normally used to "clean up" obsolete information from previous tests. It is also used to delete individual scripts that were added to a test in error.

Monitor Test or script list 1204: This function displays a list of scripts that require the attention of the Test Administrator. These include scripts that have been found to be in error or have been held by a tester; and scripts that have completed the testing cycle and may require the next run to be initiated.

The Test Administrator has three options for scripts that are in error: restart the script at a specified point in the routing sequence, reinstate the script at the point where the error was found, or remove the script from the test. Restarting a script indicates that the error was of such a nature that some processing needs to be redone. A new iteration is created.

Reinstating a script indicates that either the error was not critical enough to halt the testing process and the process can continue where it left off. A new iteration is not created. Removing a script indicates that the error was severe enough that the script cannot be executed in the test.

System Reports 1210: Allows the Test Administrator to monitor the progress of the test by reviewing various reports. According to the present invention, the following reports are defined.

Create Test: This report is executed when the Create Test function is invoked. It produces a list of scripts to be added to the specified test based on specified search criteria.

Delete Test: This report is executed when the Delete Test function is invoked. It produces an audit trail of all records deleted during the process.

Script History/Forecast Report 1212: This report produces a history/forecast report for a script. The history portion outlines where the script has been in the testing process. The forecast portion indicates where the script still has to go.

Test Statistics Report 1214: This report produces a statistical analysis of the specified test. It provides the user with various levels of information, including test and run statistics and workstation analysis. The statistics are computed based on scripts and script sets.

SIR History Report 1222: This report produces a history of SXR's reported for a specified test. Information on the report includes the number, person responsible, the status of the SIR, date opened/closed and what scripts are affected. This report also shows statistics on scripts that have been restated, reinstated and removed.

Test and SIR Statistics Report 1216: This report produces a statistical analysis of the specified test. It provides the user with various levels of information including test and run statistics and workstation analysis. These statistics are computed based on workstations per script. This report also shows how many SIR's were opened and closed for the day and the period which is covered by the report.

Tester Statistics Report 1218: This report produces a list of testers associated with a test. It provides an analysis of the workload for each tester.

Document History Report: Described in the description of the tracking sub-system.

Referring again to FIG. 12, the functionality of the script tracking administration sub-system 108 will be described. When a Test Administrator invokes the script tracking administration sub-system 108, a "script selection/test selection" screen 1202 is presented.

At the script selection/test selection screen 1202, the Test Administrator is given the option to select which tests are to be run, and which scripts are to be used in running those tests. The Test Administrator can also add a priority flag to certain scripts in a test. Additionally, the Test Administrator may choose to generate reports detailing the status of the present or past tests.

After the test is created, a report is displayed showing which workstation each script is at and verifying the creation of the script in the test. If a script could not be created, then the sub-system will display a message giving the reason why the script was not created. For example, a dependent script will not be added to the test until the script upon which it depends has been tested. The sub-system will add subsequent parts of dependent scripts automatically.

Once the scripts have been selected from the script selection/test selection screen 1202, the test can be created and the test process may begin.

If the Test Administrator chooses to monitor a test, a script list 1204 is presented. At this point, the Test Administrator is given access to a list of scripts that have either completed a run or require some action. Through the use of function codes or PF keys, the Test Administrator can choose to reinstate a script, restart a script, remove a script from the test list, refresh the script list, initiate a new run for an individual script, or scroll through the script list.

The Test Administrator may choose to generate a create test report 1206 detailing the list of scripts selected for that particular test. Create test report 1206 can also be generated from script selection/test selection screen 1202.

If the Test Administrator deletes a test from script selection/test selection screen 1202 via the delete test function, the a delete test report 1208 is generated. This produces an audit trail of all records deleted during the test processes.

From script selection/test selection screen 1202 the Test Administrator may choose to generate various system reports. If such a selection is made, the Test Administrator is presented with a report menu screen 1210. From report menu screen 1210 numerous system reports may be generated. The Test Administrator may choose to generate a script history/forecast report 1212. This report produces a history and forecast report for a script. The history portion of this report outlines where the script has been in a testing process. The forecast portion of this report indicates to which locations the script will go from the current time through completion of the test.

The Test Administrator may choose to generate a test satisfies report 1214. This report produces a statistical analysis of the specified test. It provides various levels of information including test statistics, run statistics, and workstation analysis.

The Test Administrator may choose to generate a tester statistics report 1218. This report produces a list of testers associated with the specified test and provides an analysis of the workload of each tester.

If the Test Administrator wishes to generate an SIR history report, the Test Administrator makes the appropriate selection on report menu 1210 and is presented with an SIR information parameters function 1220. From SIR information parameters function 1220 the Test Administrator can generate an SIR statistics report 1222. This report produces a statistical analysis of the number of SIR's reported for a specified test. Information contained in this report includes the number of SIR's, the status of each SIR, and which scripts were affected.

From script list 1204, the Test Administrator can also choose to restart a script or a scroll through document history and print an SIP. information report. If the Test Administrator chooses to restart a script, a restart workstation screen 1224 is presented. At this screen, the Test Administrator can choose to restart a script at a specific workstation. If a restart is selected, the sub-system will displays a document entry screen 1225. The Test Administrator uses this screen to enter a message to the testers.

If the Test Administrator chooses to view the document history of a script, he is presented with a document history screen 1226. From document history screen 1226, the Test Administrator can scroll through the various documents and choose to print an SIR information report 1228.

Blocks 1205, 1207, 1229 and 1227 indicate other functions which can be executed from script selection/test selection screen 1202, script list 1204, restart station function 1225, and document history function 1226, respectively.

As previously mentioned, the functions of the script tracking administration sub-system are invoked using SAP function keys (PF keys) or function codes. The specific function keys and function codes are shown in FIG. 12.

c. Operation

Figure 13:
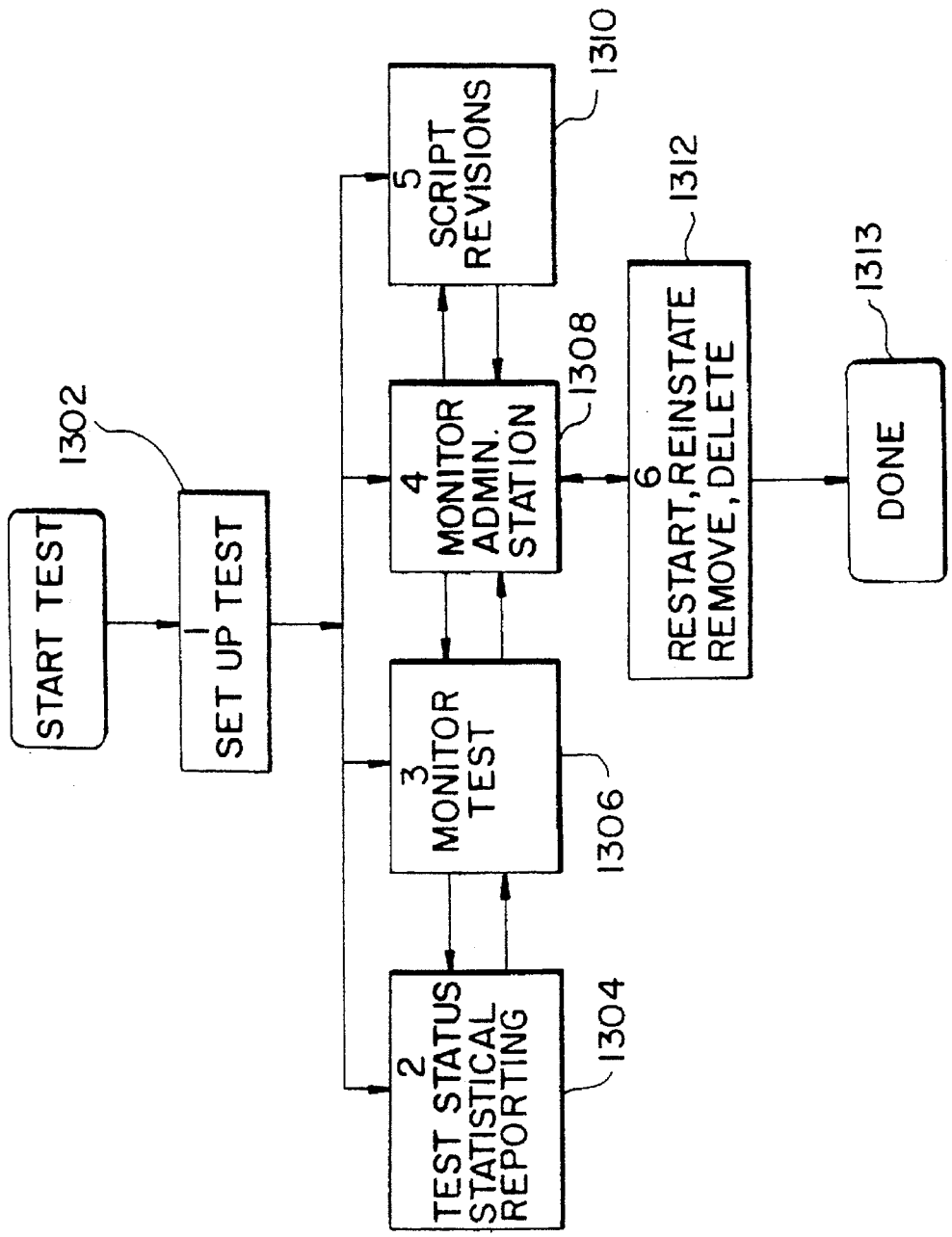
FIG. 13 is a high level flow diagram of the general flow of the sub-system YTRA for a preferred embodiment of the present invention.

When invoking the script tracking administration sub-system (YTRA) to identify the scripts for a specific test, initiate a testing process, and monitor the progress of a test, a general methodology is followed by the Test Administrator. This methodology is described with reference to FIGS. 12 and 13.

In a step 1302, the Test Administrator initiates the test process. This is done via a script selection/test selection screen 1202. Once the script is created, the test is executed. During execution, in a step 1304, the Test Administrator generates reports on the test status and statistics of the test. These reports are generated from report menu 1210.

In a step 1306, the Test Administrator monitors the test. This is done from the script list screen 1204 and through the use of reports.

In a step 1310, the Test Administrator can make revisions to the scripts used in the specified test. Such script revisions are made through sub-system YSCR. As previously mentioned, the Test Administrator can reinstate scripts, restart scripts, remove scripts, and create a next run of a script from script list 1204.

In a step 1308, the Test Administrator monitors the tracking administrator workstation. Note that steps 1304, 1306, 1308, and 1310 can interact dynamically with one another (indicated by arrows between the blocks in FIG. 13), and need not occur sequentially or in any particular order.

The Test Administrator is given several options at step 1312. These are presented in script list 1204 and include restarting a script at any point prior to where the script was put on hold, reinstating the test from the point at which it was halted, removing a script from an operating test, or deleting a test in its entirety. The end of the test run in indicated at a step 1313.

V. SCRIPT TRACKING SUB-SYSTEM (YTRK)

a. Purpose

The script tracking sub-system (YTRK) is the section of SIS that facilitates the remote testing process. The script tracking sub-system automates and controls the testing process and allows for recording of all required information.

The normal testing process includes: 1) selecting a script for testing, 2) running the test, 3) recording test results and any errors, and 4) passing the script on to the next workstation at the completion of the test at the current workstation.

b. Sub-system Functions

Figure 14:
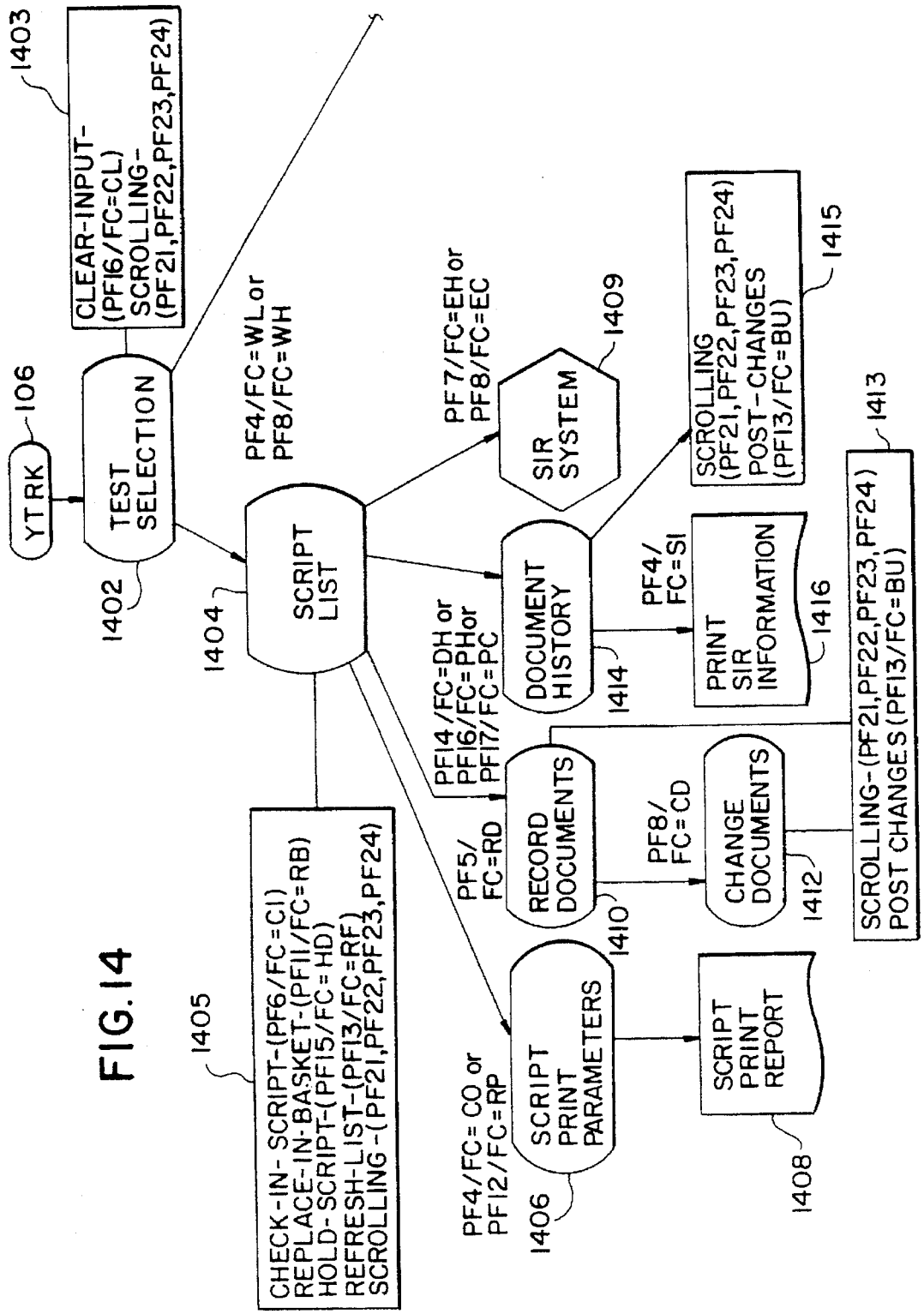
FIG. 14 depicts the initial menu selections available in sub-system YTRK in a preferred embodiment of the present invention.
Figure 14:
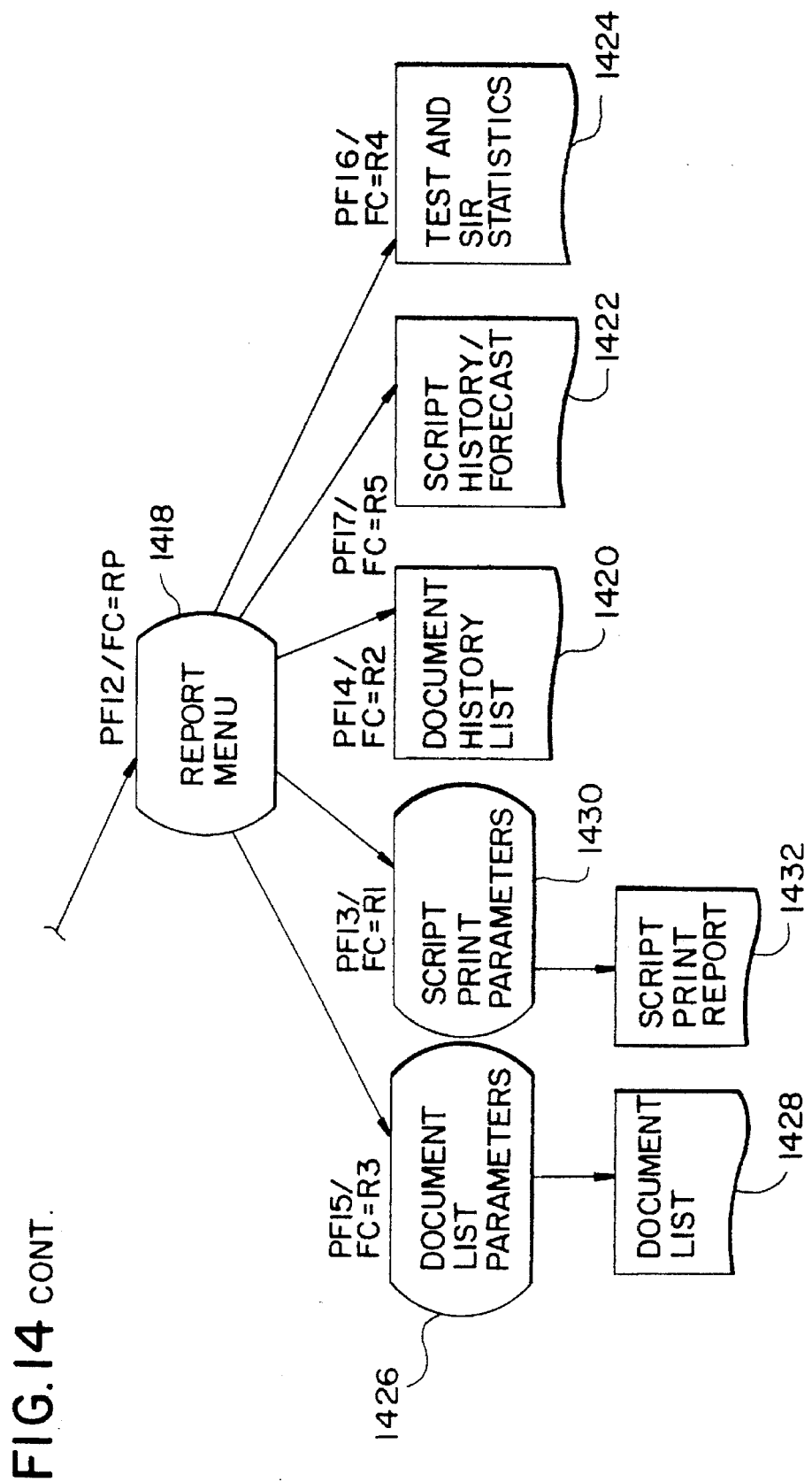

The script tracking sub-system according to the present invention provides functionality to SIS to automate and control the testing process, and to record all required information. FIG. 14 is a high-level functional diagram of the script tracking sub-system which illustrates the functions of this sub-system in terms of access screens and reports.

From a test selection screen 1402, a tester will specify which test, run, testcenter, and workstation are to be tested. The test can further select a script list 1404 (list of scripts currently assigned to the particular workstation or that need to be routed to that workstation) or a report menu 1418. Testing a script requires the tester to follow a controlled sequence of events. These events are outlined below.

Script list screen 1404 provides the following functions:

Check-Out-Script: This function assigns the script to the tester at a terminal of the logical workstation. Once a script has been assigned to a tester at a terminal, other testers are prevented from using that script to conduct a test. Once a script is checked-out, the tester performs the scenario choreographed by the script.

Check-In-Script: This function tags the script as being completed at the current workstation. When the script is completed at a workstation and checked-in, tracking information is set up to enable the next workstation to check-out the script for testing. When the script is checked-in at the final workstation indicated in its routing section, the script is flagged as a completed script and will mute to the test administrator.

Hold Script: This function allows the tester to place the script "on hold" without the need to record an error. The script routes to the Test Administrator.

Replace-in-Basket: This function allows a tester to return (to the workstation's "in basket") a script which he has checked-out. This allows another tester within the logical workstation to execute the script.

A scrolling and refresh-list function are also included (see block 1405).

Other functions available from script list 1404 include the following.

Print Script Screen 1406: This function prints the contents of the script and all current document information as a report 1408.

Record Documents Function 1410: Usually, a tester will have information to record at the completion of its portion of the test. This record documents function allows the tester to store this information so that it will be available to workstations that subsequently perform the test outlined in the script. From the record documents function 1410, the tester may also chose a change documents function 1412. Additional functions available from screens 1410,1412 are shown in block 1413.

Document History Function 1414: This function displays all documents and information currently recorded for a selected script. An SIR information report 1416 is generated by this function. Additional functions available from screen 1414 are shown in block 1415.

SIR System 1409: The SIR system is used when the tester identifies an error within the results of the test. The SIR system flags the script with the error and records the information regarding the error. Depending on the severity of the error, the tester has the option to either "hold" or "continue" the testing process for that script. In many cases, a tester will identify the same problem in different scripts. In such a case, the system provides the tester with an option to choose from a list of SIR's that have been previously recorded.

System Reports Menu 1418: This function allows the testers to monitor the progress of the test by generating various reports. These are listed below.

Script Print Parameter 1430: This function generates a script print report 1432.

Document History Report 1420: This report produces a list of all documents (and related information) associated with a specified script within a test.

Document List Parameters 1426: This function generates a document list report 1428 which lists the documents generated during a test.

Script History/Forecast Report 1422: This report produces a history and forecast report for a script. The history portion of this report outlines where the script has been in a testing process. The forecast portion of this report indicates to which locations the script will go from the current time through completion of the test.

Test and SIR Statistics Report 1424: This report produces a statistical analysis of the number of SIR's reported for a specified test. Information contained in this report includes the number of SIR's, the status of each SIR, and which scripts were affected.

Referring to FIG. 14, the functionality of the script tracking sub-system is now described. This functionality is described in terms of a tester participating in a test at a particular terminal. The general methodology followed by the tester is to view a list of scripts for testing, select a script to be tested, run the test according to the script, record test results, and then flag the script as having been completed at that workstation.

When a tester invokes the script tracking sub-system, a test selection screen 1402 is presented. At the test selection screen 1402, the tester is given the option of selecting a test to be run, generating a selection of reports, or viewing the history of the workstation or of a script.

If the tester chooses to run a test, a script list 1404 is presented to the tester. The script list 1404 provides a listing of all scripts which can be run by that particular workstation. This includes scripts that have already been run by a previous workstation and not run by the present workstation.

At script list 1404, the tester can scroll through the list of scripts on the screen. From this list, the tester may select (check-out) a script to be tested, replace a script, hold a script, refresh a list on the screen, and cheek-in a script when completed.

From script list 1404, the workstation user (i.e., tester) may also print a script report 1408, record 1410 or change 1412 documents, print error information 1416, view document history 1414, or access the SIR system 1409.

If the workstation user chooses to generate a script print report 1408, the workstation user is presented with a script print parameters function 1406. From this screen, the workstation user can generate a script print report 1408. The script print report is a hard copy of the contents of the script selected and all current document information pertaining to that script. All current document information refers to documents recorded for the script for the current test, run and iteration, at previous and current workstations.

If the tester chooses to record documents at the script list 1404, the workstation tester uses a record document function 1410. This stores any information generated during the test so that it is available to subsequent workstations. From record document function 1410, the tester can select a change documents function 1412 which allows a tester to post changes to previously recorded documents and information. Only those documents recorded at the current workstation are displayed and available for editing.

If, from script list 1404, the tester chose the document history option, a document history function 1414 displays all documents and information currently recorded for the script.

At this screen, the user can choose to generate an SIR information report 1416. The tester is provided with a capability of scrolling through the display at the document history screen. Finally, from script list 1404, the workstation user can invoke the SIR system 1418.

From test selection screen 1402, the tester may also choose to generate various sub-system reports. If such a selection is made, the tester is presented with a report menu 1418. From report menu 1418, numerous sub-system reports may be generated. The tester may choose to generate a document history list report 1420. Document history list report 1420 is a list of all documents and related information associated with a specified script within a test.

The tester may also choose to generate a script history/forecast report 1422. Script history/forecast report 1422 produces a history and a forecast report for a script. The history portion outlines where the script has been in a testing process. The forecast portion indicates remaining destinations for the script.

Another report which may be generated from report menu 1418 is the Test and SIR statistics report 1424. As described above, Test and SIR statistics report 1424 provides a statistical analysis of the number of SIR's reported for a specified test.

The tester may choose to pull up a document list parameter function 1426 from report menu 1418. The document list parameter function 1426 allows the tester to specify document types or choose all documents to generate a document list report 1428. Document list report 1428 produces a list of all documents generated during a test which match the type selected.

Finally, the tester can select a script print parameter function 1430. Script print parameter function 1428 provides the tester with the opportunity to generate a script print report 1432. Script print report 1432 is a printout of the contents of the script in a formatted style.

As with other sub-systems in SIS, the functions of the script tracking sub-system are invoked using PFkeys or SAP function keys. These are shown on FIG. 14.

c. Method of Script Tracking

Figure 15:
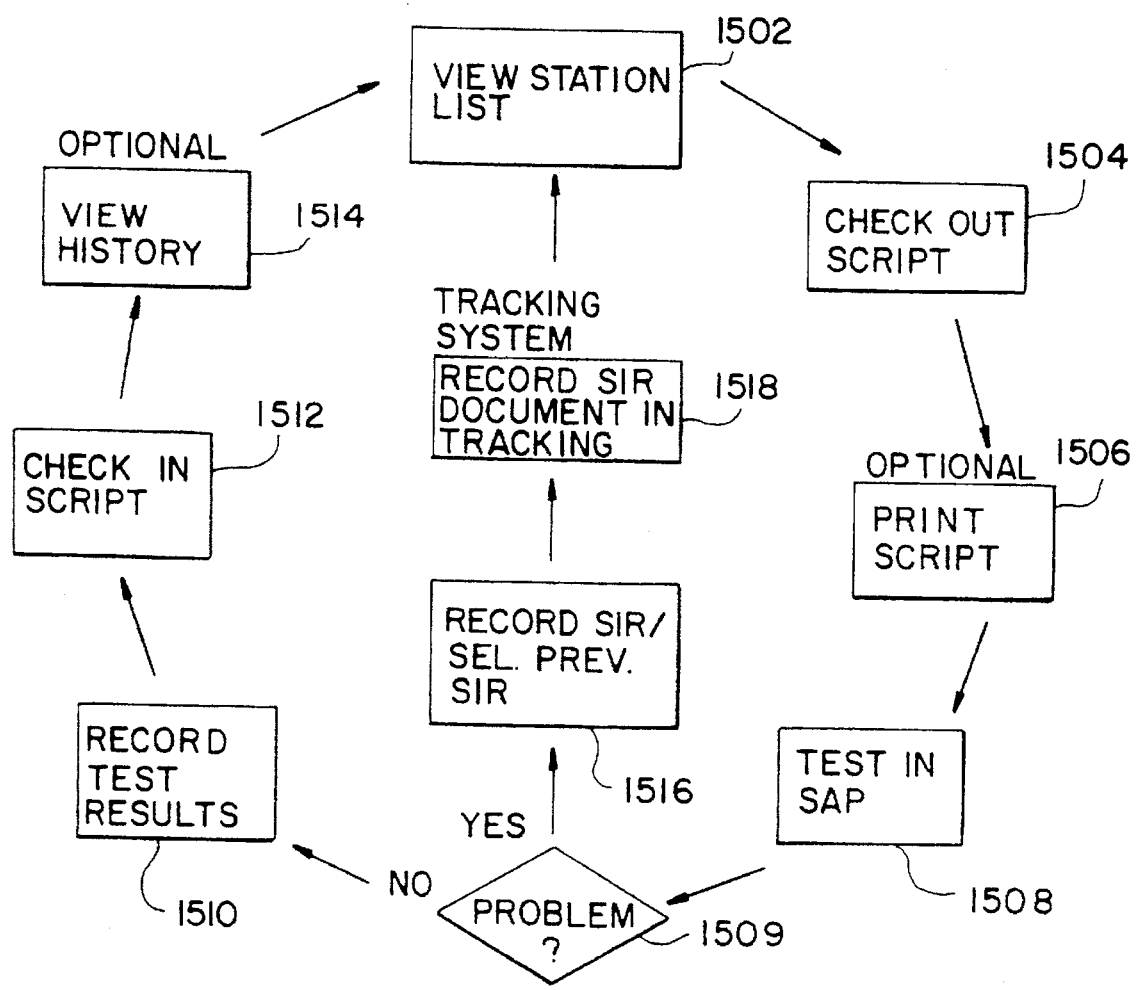
FIG. 15 is a flow chart which depicts the general methodology of script tracking and the execution of a script at a workstation.

When a tester at a workstation sets out to execute a script, a general methodology is followed. FIG. 15 sets forth this methodology in the form of a flow chart. FIG. 15 also illustrates script tracking at a workstation.

Referring to FIGS. 14 and 15, the tracking process will be described. In a step 1502, a tester views a list of scripts available to be run at the particular workstation. The list of available scripts appears on script list screen 1404. The scripts on this list are unavailable for use by other workstations until the present workstation has completed its test with the script. From this screen, in a step 1504, the tester chooses to check-out a script to be followed. In other words, the tester selects a script from the script list. Once a script is checked-out by a terminal, it will no longer display on other tester's lists, to avoid more than one tester checking-out the same script.

In a step 1506, the tester may choose to print the script that has been selected for testing. This will provide the tester with a hard copy of the script and documents recorded for the script to be followed during the test.

In a step 1508, the tester runs the test as outlined in the script selected. The script gives the tester information to be entered at the workstation and the expected results. If a problem is detected at step 1409 (during test execution), then the problem is handled as discussed below in steps 1516 and 1518. If, however, no problems are encountered, then the test results are recorded in a step 1510. This step provides a history of the documents that have been recorded for the particular script.

In a step 1512, the tester checks-in the script from script list screen 1404. Checking-in the script removes the script from the current workstation and displays the script at the next workstation on the script routing. The script is then available for use by the next workstation.

The tester then has the option of viewing the history of the test conducted at that workstation at a step 1514, before proceeding to process another script at step 1502.

If a problem was detected at step 1409, then the tester records an SIR at step 1516 and the SIR document number is automatically recorded into SIS at step 1518. If the script cannot continue and is held, this marks the completion of the test for that particular script and the tester may proceed with a new script at step 1502. If the script can continue, then the tester continues processing the script at either step 1508 or 1510, depending on where the problem was encountered.

VI. CONCLUSION

In general the present invention includes a system and method for defining testing scenarios for a multi-user computer system with a plurality of workstations, and for driving and tracking the execution at the workstations of the testing scenarios in a predefined order. In a preferred embodiment of the present invention, the testing revolves around the concept of a "script". A script includes instructions and data necessary to simulate the functionality to be tested.

While the invention provides an efficient testing tool, the inventors contemplate the invention may be further improved by the incorporation of a keystroke recording means to simulate a user interface. A keystroke recording and playback means would remove the requirement that testers (i.e., users present at each workstation to act out the instructions in each script) be used. The keystroke recording and playback means would perform all functions performed by the testers except for, possibly, verifying test results. An example of a keystroke recording and playback means which may be suitable/adaptable for such a purpose is PlayBack, available from Compuware Corporation, Farmington Hills, Mich.

While preferred embodiments of the invention have been described, various modifications, alterations, and changes may be made without departing from the spirit and scope of the present invention as defined in the appended claims.

We claim:

1. A computer-based testing system for defining and managing a test for a multi-user computer system, the multi-user computer system including a plurality of workstations, the testing system comprising:

(a) maintenance and creation means for creating and modifying a plurality of scripts, wherein each of said plurality of scripts contains instructions, data and routing information, said routing information being indicative of the workstations to which a script should be routed and in what order;

(b) tracking administration means for grouping selected ones of said scripts to form the test, initiating a test run, monitoring routing of said scripts from workstation to workstation, and, in an error situation, selectively controlling routing of said scripts from workstation to workstation; and (c) tracking means for routing said selected ones of said plurality of scripts to selected ones of the workstations according to said routing information.

2. The testing system of claim 1, wherein said tracking means further comprises means for assigning a selected one of said plurality of scripts to a first terminal of a first workstation in response to a first command from said first terminal.

3. The testing system of claim 2, wherein said tracking means further comprises means for displaying said instructions contained in said selected one of said plurality of scripts at said first terminal in response to a second command from said first terminal.

4. The testing system of claim 2, wherein said tracking means further comprises means for receiving and recording test results from said first terminal.

5. The testing system of claim 4, wherein said tracking means further comprises means for transferring said selected one of said plurality of scripts from said first workstation to a second workstation in response to a third command from said first terminal and in accordance with said routing information in said selected one of said plurality of scripts.

6. The testing system of claim 1, wherein said maintenance and creation means further comprises means for automatically generating the routing information for a selected one of said plurality of scripts based upon said instructions in said selected one of said plurality of scripts.

7. The testing system of claim 1, further comprises (d) script administration means for setting a status code, a blocking indicator and a category indicator for a selected group of said plurality of scripts and for copying and deleting selected ones of said plurality of scripts.

8. The testing system of claim 1, wherein said tracking administration means further comprises means for generating statistical reports documenting execution statistics for the test.

9. A computer-based testing system for driving and tracking the execution of a plurality of scripts which are used to create a test for a multi-user computer system which includes a plurality of workstations, wherein each script contains instructions, data and routing information, said routing information being indicative of the workstations to which a script should be routed and in what order, the testing system comprising:

(a) tracking administration means for selectively grouping selected ones of the plurality of scripts to form the test, for initiating a test run, and for monitoring the transfer of said selected ones of the plurality of scripts from workstation to workstation; and (b) tracking means for transferring said selected ones of the plurality of scripts to selected ones of the plurality of workstations according to said routing information.

10. The testing system of claim 9, wherein said tracking means further comprises means for assigning a selected one of the plurality of scripts to a first terminal of a first workstation in response to a first command from said first terminal.

11. The testing system of claim 10, wherein said tracking means further comprises means for displaying the instructions contained in said selected one of the plurality of scripts at said first terminal in response to a second command from said first terminal.

12. The testing system of claim 11, wherein said tracking means further comprises means for receiving and recording test results from said first terminal.

13. The testing system of claim 12, wherein said tracking means further comprises means for transferring said selected one of the plurality of scripts from said first workstation to a second workstation in response to a third command from said first terminal and in accordance with the routing information in said selected one of the plurality of scripts.

14. The testing system of claim 13, wherein said tracking administration means further comprises means for selectively overriding said tracking means to control the transfer of said selected one of the plurality of scripts.

15. The testing system of claim 9, wherein said tracking administration means further comprises means for generating statistical reports documenting execution statistics for the test.

16. A computer-based method for driving and tracking the execution of a plurality of scripts which are used to create a test for a multi-user computer system which includes a plurality of workstations, wherein each script contains instructions, data and routing information, said routing information being indicative of the workstations to which a script should be routed and in what order, the method comprising:

(1) initiating a run of the test in response to a command from a test administrator entered via one of the plurality of workstations;

(2) routing a selected one of the plurality of scripts to a selected one of the plurality of workstations as indicated in the routing information of said selected one of the plurality of scripts;

(3) allowing a user at said selected one of the plurality of workstations to execute a portion of the test in accordance with the instructions contained in said selected one of the plurality of scripts;

(4) transferring said selected one of the plurality of scripts to a next selected one of the plurality of workstations as indicated in the routing information of said selected one of the plurality of scripts in response to a command from said selected one of the plurality of workstations; and (5) repeating step (2) through (4) for each of the plurality of scripts until each said selected one of the plurality of scripts has been transferred in order to each workstation as indicated in the routing information.

17. The method of claim 16, wherein step (3) further comprises recording test results input by said user at said selected one of the plurality of workstations.

18. The method of claim 17, wherein step (3) further comprises recording error information input by said user at said selected one of the plurality of workstations when an error is detected by said user during the execution of said portion of the test.

19. The method of claim 18, further including between step (3) and step (4) the step of selectively controlling the transfer of said selected one of the plurality of scripts in response to a command from a test administrator entered via one of the plurality of workstations.

20. A computer-based testing system comprising:

(a) a multi-user computer system including a plurality of workstations coupled to a central computer;

(b) a database configured to store scripts, wherein each of said plurality of scripts contains instructions, data and routing information, said routing information being indicative of the workstations to which a script should be routed and in what order;

(c) maintenance and creation means for creating and modifying said plurality of scripts; and (d) tracking means for routing selected ones of said plurality of scripts to selected ones of said plurality of workstations according to said routing information.

21. The testing system of claim 20, further comprising (e) tracking administration means for grouping selected ones of said scripts to form the test, initiating a test run, and monitoring and, in an error situation, selectively controlling routing of said scripts from workstation to workstation.

22. The testing system of claim 21, wherein said tracking administration means further comprises means for automatically generating statistical reports documenting execution statistics for the test.

* * * * *